US007333622B2

(12) United States Patent
Algazi et al.

(10) Patent No.: US 7,333,622 B2
(45) Date of Patent: Feb. 19, 2008

(54) DYNAMIC BINAURAL SOUND CAPTURE AND REPRODUCTION

(75) Inventors: V. Ralph Algazi, Davis, CA (US); Richard O. Duda, Menlo Park, CA (US); Dennis Thompson, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 708 days.

(21) Appl. No.: 10/414,261

(22) Filed: Apr. 15, 2003

(65) Prior Publication Data

US 2004/0076301 A1 Apr. 22, 2004

Related U.S. Application Data

(60) Provisional application No. 60/419,734, filed on Oct. 18, 2002.

(51) Int. Cl.

| | |
|---|---|
| ***H04R 5/02*** | (2006.01) |
| ***H04R 5/00*** | (2006.01) |
| ***H04R 1/10*** | (2006.01) |
| ***H04R 3/00*** | (2006.01) |
| ***G01S 3/80*** | (2006.01) |

(52) U.S. Cl. ........................ 381/310; 381/309; 381/26; 381/74; 381/92; 367/125

(58) Field of Classification Search ................ 381/309, 381/310, 26, 74, 17, 91, 119, 122, 92; 367/125, 367/124

See application file for complete search history.

(56) References Cited

U.S. PATENT DOCUMENTS 4,817,149 A 3/1989 Myers
5,570,324 A * 10/1996 Geil ........................... 367/124
6,021,206 A * 2/2000 McGrath .................... 381/310
6,084,973 A 7/2000 Green et al.
6,243,476 B1 6/2001 Gardner
6,259,795 B1 7/2001 McGrath
6,532,291 B1 3/2003 McGrath
6,763,115 B1 * 7/2004 Kobayashi .................. 381/309
6,845,163 B1 * 1/2005 Johnston et al. .............. 381/92
2001/0040969 A1 11/2001 Revit et al.
2002/0150257 A1 10/2002 Wilcock et al.
2003/0059070 A1 3/2003 Ballas (Continued)

OTHER PUBLICATIONS

M. A. Gerzon, "Ambisonics in multichannel broadcasting and video," Preprint 2034, 74th Convention of the Audio Engineering Society (New York, Oct. 8-12, 1983); subsequently published in J. Aud. Eng. Soc., vol. 33, No. 11, pp. 859-871 (Oct. 1985).

(Continued)

*Primary Examiner*—Vivian Chin
*Assistant Examiner*—Douglas Suthers
(74) *Attorney, Agent, or Firm*—John P. O'Banion

(57) ABSTRACT

A new approach to capturing and reproducing either live or recorded three-dimensional sound is described. Called MTB for "Motion-Tracked Binaural," the method employs several microphones, a head tracker, and special signal-processing procedures to combine the signals picked up by the microphones. MTB achieves a high degree of realism by effectively placing the listener's ears in the space where the sounds are occurring, moving the virtual ears in synchrony with the listener's head motions. MTB also provides a universal format for recording spatial sound.

27 Claims, 10 Drawing Sheets

U.S. PATENT DOCUMENTS

2003/0076973 A1* 4/2003 Yamada ...................... 381/309

OTHER PUBLICATIONS

J. S. Bamford and J. Vanderkooy, "Ambisonic Sound for Us," Preprint 4138, 99th Convention of the Audio Engineering Society (New York, Oct. 6-9, 1995).
W. G. Gardner, "3-D Audio Using Loudspeakers" (Kluwer Academic Publishers, Boston, 1998), pp. 17-18.
M. M. Boone, "Acoustic rendering with wave field synthesis," Proc. ACM SIGGRAPH and Eurographics Campfire:Acoustic Rendering for Virtual Environments, Snowbird, UT, May 26-29, 2001, pp. 1-9).
J. Sunier, "Binaural overview: Ears where the mikes are. Part I," Audio, vol. 73, No. 11, pp. 75-84 (Nov. 1989).
J. Sunier, "Binaural overview: Ears where the mikes are. Part II," Audio, vol. 73, No. 12, pp. 49-57 (Dec. 1989).
K. Genuit, H. W. Gierlich, and U. Künzli, "Improved possibilities of binaural recording and playback techniques," Preprint 3332, 92nd Convention Audio Engineering Society (Vienna, Mar. 1992).
H. Møller, "Fundamentals of binaural technology," Applied Acoustics, vol. 36, No. 5, pp. 171-218 (1992).
(M. D. Burkhard and R. M. Sachs, "Anthropometric manikin for auditory research," J. Acoust. Soc. Am., vol. 58, pp. 214-222 (1975).
A. Karamustafaoglu, U. Horbach, R. Pellegrini, P. Mackensen and G. Theile, "Design and applications of a data-based auralization system for surround sound," Preprint 4976, 106th Convention of the Audio Engineering Society (Munich, Germany, May 8-11, 1999), pp. 1-24.
F. Rumsey, "Spatial Audio" (Focal Press, Oxford, 2001), pp. 204-205.
D. G. Malham, "Approaches to spatialisation," and which appeared in Organised Sound, vol. 3, No. 2, pp. 167-177, Cambridge University Press, 1998.
Staff Technical Writer, "Spatial Audio," Journal of the Audio Engineering Society, vol. 55, No. 6, pp. 537-541, Jun. 2007.
V. R. Algazi, R. O. Duda and D.M. Thompson, "Motion-Tracked Binaural Sound", Paper 6015, 116th Convention of the Audio Engineering Society, Berlin, Germany, May 2004.
J. B. Melick, V. R. Algazi, R. O. Duda, and Thompson, D. M., "Customization for personalized rendering of motion-tracked binaural sound," Paper 6225, 117th Convention of the Audio Engineering Society, San Francisco, CA, Oct. 2004.
V. R. Algazi, R. O. Duda and D. M. Thompson, "Motion-Tracked Binaural Sound," Journal of the Audio Engineering Society, vol. 52, No. 11, pp. 1142-1156, Nov. 2004.
V. R. Algazi, R. J. Dalton, R. O. Duda and D. M. Thompson, "Motion-Tracked Binaural Sound for Personal Music Players," Paper 6557, 119th Convention of the Audio Engineering Society, New York, NY, Oct. 2005.
V. R. Algazi and R. O. Duda, "Immersive spatial sound for mobile multimedia," ISM 2005 (Proc. Seventh IEEE International Symposium on Multimedia), pp. 739-746, Irvine, CA, Dec. 2005.
R. C-M Hom, V. R. Algazi and R. O. Duda, "High-frequency interpolation for motion-tracked binaural sound," Paper 6963, 121st Convention of the Audio Engineering Society, San Francisco, CA, Oct. 2006.

* cited by examiner

152

AA

A. Use a separate complementary microphone.

B. Use one of the array microphones.

C. Use one dynamically-switched array microphones.

D. Use two dynamically-switched array microphones.

E. Use two array microphones with spectral interpolation.

FIG. 7B

An MTB Array for Direction Finding

DYNAMIC BINAURAL SOUND CAPTURE AND REPRODUCTION

CROSS-REFERENCE TO RELATED APPLICATIONS

This application claims priority from U.S. provisional application Ser. No. 60/419,734 filed on Oct. 18, 2002, incorporated herein by reference.

STATEMENT REGARDING FEDERALLY SPONSORED RESEARCH OR DEVELOPMENT

This invention was made with Government support under Grant Nos. IIS-00-97256 and Grant No. ITR-00-86075, awarded by the National Science Foundation. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to spatial sound capture and reproduction, and more particularly to methods and systems for capturing and reproducing the dynamic characteristics of three-dimensional spatial sound.

2. Description of Related Art

There are a number of alternative approaches to spatial sound capture and reproduction, and the particular approach used typically depends upon whether the sound sources are natural or computer-generated. An excellent overview of spatial sound technology for recording and reproducing natural sounds can be found in F. Rumsey, *Spatial Audio* (Focal Press, Oxford, 2001), and a comparable overview of computer-based methods for the generation and real-time "rendering" of virtual sound sources can be found in D. B. Begault, 3-D *Sound for Virtual Reality and Multimedia* (AP Professional, Boston, 1994). The following is an overview of some of the better known approaches.

Surround sound (e.g. stereo, quadraphonics, Dolby® 5.1, etc.) is by far the most popular approach to recording and reproducing spatial sound. This approach is conceptually simple; namely, put a loudspeaker wherever you want sound to come from, and the sound will come from that location. In practice, however, it is not that simple. It is difficult to make sounds appear to come from locations between the loudspeakers, particularly along the sides. If the same sound comes from more than one speaker, the precedence effect results in the sound appearing to come from the nearest speaker, which is particularly unfortunate for people seated close to a speaker. The best results restrict the listener to staying near a fairly small "sweet spot." Also, the need for multiple high-quality speakers is inconvenient and expensive and, for use in the home, many people find the use of more than two speakers unacceptable.

There are alternative ways to realize surround sound to lessen its limitations. For example, home theater systems typically provide a two-channel mix that includes psychoacoustic effects to expand the sound stage beyond the space between the two loudspeakers. It is also possible to avoid the need for multiple loudspeakers by transforming the speaker signals to headphone signals, which is the technique used in the so-called Dolby® headphones. However, each of these alternatives also has its own limitations.

Surround sound systems are good for reproducing sounds coming from a distance, but are generally not able to produce the effect of a source that is very close, such as someone whispering in your ear. Finally, making an effective surround-sound recording is a job for a professional sound engineer; the approach is unsuitable for teleconferencing or for an amateur.

Another approach is Ambisonics™. While not widely used, the Ambisonics approach to surround sound solves much of the problem of making the recordings (M. A. Gerzon, "Ambisonics in multichannel broadcasting and video," Preprint 2034, 74th Convention of the Audio Engineering Society (New York, Oct. 8-12, 1983); subsequently published in *J. Aud. Eng. Soc.*, Vol. 33, No. 11, pp. 859-871 (October, 1985)). It has been described abstractly as a method for approximating an incident sound field by its low-order spherical harmonics (J. S. Bamford and J. Vanderkooy, "Ambisonic sound for us," Preprint 4138, 99th Convention of the Audio Engineering Society (New York, Oct. 6-9, 1995)). Ambisonic recordings use a special, compact microphone array called a SoundField™ microphone to sense the local pressure plus the pressure differences in three orthogonal directions. The basic Ambisonic approach has been extended to allow recording from more than three directions, providing better angular resolution with a corresponding increase in complexity.

As with other surround-sound methods, Ambisonics uses matrixing methods to drive an array of loudspeakers, and thus has all of the other advantages and disadvantages of multi-speaker systems. In addition, all of the speakers are used in reproducing the local pressure component. As a consequence, when the listener is located in the sweet spot, that component tends to be heard as if it were inside the listener's head, and head motion introduces distracting timbral artifacts (W. G. Gardner, 3-*D Audio Using Loudspeakers* (Kluwer Academic Publishers, Boston, 1998), p. 18).

Wave-field synthesis is another approach, although not a very practical one. In theory, with enough microphones and enough loudspeakers, it is possible to use sounds captured by microphones on a surrounding surface to reproduce the sound pressure fields that are present throughout the interior of the space where the recording was made (M. M. Boone, "Acoustic rendering with wave field synthesis," *Proc. ACM SIGGRAPH and Eurographics Campfire: Acoustic Rendering for Virtual Environments*, Snowbird, Utah, May 26-29, 2001)). Although the theoretical requirements are severe (i.e., hundreds of thousands of loudspeakers), systems using arrays of more than 100 loudspeakers have been constructed and are said to be effective. However, this approach is clearly not cost-effective.

Binaural capture is still another approach. It is well known that it is not necessary to have hundreds of channels to capture three-dimensional sound; in fact, two channels are sufficient. Two-channel binaural or "dummy-head" recordings, which are the acoustic analog of stereoscopic reproduction of 3-D images, have long been used to capture spatial sound (J. Sunier, "Binaural overview: Ears where the mikes are. Part I," *Audio*, Vol. 73, No. 11, pp. 75-84 (November 1989); J. Sunier, "Binaural overview: Ears where the mikes are. Part II," *Audio*, Vol. 73, No. 12, pp. 49-57 (December 1989); K. Genuit, H. W. Gierlich, and U. Künzli, "Improved possibilities of binaural recording and playback techniques," Preprint 3332, 92nd Convention Audio Engineering Society (Vienna, March 1992)). The basic idea is simple. The primary source of information used by the human brain to perceive the spatial characteristics of sound comes from the pressure waves that reach the eardrums of the left and right ears. If these pressure waves can be reproduced, the listener should hear the sound exactly as if he or she were present when the original sound was produced.

The pressure waves that reach the ear drums are influenced by several factors, including (a) the sound source, (b) the listening environment, and (c) the reflection, diffraction and scattering of the incident waves by the listener's own body. If a mannequin having exactly the same size, shape, and acoustic properties as the listener is equipped with microphones located in the ear canals where the human ear drums are located, the signals reaching the eardrums can be transmitted or recorded. When the signals are heard through headphones (with suitable compensation to correct for the transfer function from the headphone driver to the ear drums), the sound pressure waveforms are reproduced, and the listener hears the sounds with all the correct spatial properties, just as if he or she were actually present at the location and orientation of the mannequin. The primary problem is to correct for ear-canal resonance. Because the headphone driver is outside the ear canal, the ear-canal resonance appears twice; once in the recording, and once in the reproduction. This has led to the recommendation of using so-called "blocked meatus" recordings, in which the ear canals are blocked and the microphones are flush with the blocked entrance (H. Møller, "Fundamentals of binaural technology," *Applied Acoustics*, Vol. 36, No. 5, pp. 171-218 (1992)). With binaural capture, and, in particular, in telephony applications, the room reverberation sounds natural. It is a universal experience with speaker phones that the environment sounds excessively hollow and reverberant, particularly if the person speaking is not close to the microphone. When heard with a binaural pickup, awareness of this distracting reverberation disappears, and the environment sounds natural and clear.

Still, there are problems associated with binaural sound capture and reproduction. The most obvious problems are actually not always important. They include (a) the inevitable mismatch between the size, shape, and acoustic properties of a mannequin and any particular listener, including the effects of hair and clothing, (b) the differences between the eardrum and a microphone as a pressure sensing element, and (c) the influence of non-acoustic factors such as visual or tactile cues on the perceived location of sound sources. In the KEMAR™ mannequin, for example, considerable effort was devoted to using a so-called "Zwislocki coupler" to simulate the effects of the eardrum impedance (M. D. Burkhard and R. M. Sachs, "Anthropometric manikin for auditory research," *J. Acoust. Soc. Am.*, Vol. 58, pp. 214-222 (1975). KEMAR is manufactured by Knowles Electronics, 1151 Maplewood Drive, Itasca, Ill., 60143). However, it will be appreciated that microphones, good as they can be, are not equivalent to eardrums as transducers.

A much more important limitation is the lack of the dynamic cues that arise from motion of the listener's head. Suppose that a sound source is located to the left of the mannequin. The listener will also hear the sound as coming from the listener's left side. However, suppose that the listener turns to face the source while the sound is active. Because the recording is unaware of the listener's motion, the sound will continue to appear to come from the listener's left side. From the listener's perspective, it is as if the sound source moved around in space to stay on the left side. If there are many sound sources active, when the listener moves, the experience is that the whole acoustic world moves in exact synchrony with the listener. To have a sense of "virtual presence," that is, of actually being present in the environment where the recording was made, stationary sound sources should remain stationary when the listener moves. Said another way, the spatial locations of virtual auditory sources should be stable and independent of motions of the listener.

There is reason to believe that the effects of listener motion are responsible for another defect of binaural recordings. It is a universal experience when listening to binaural recordings that sounds to the left or right seem to be naturally distant, but sounds that are directly ahead always seem to be much too close. In fact, some listeners experience the sound source as being inside their heads, or even in back. Several reasons have been advanced for this loss of "frontal externalization." One argument is that we expect to see sound sources that are directly ahead of us, and when the confirming visual cue is absent, we tend to project the location of the source behind us. Indeed, in real-life situations it is frequently difficult to tell whether a source of sound is in front of us or behind us, which is why we turn to look around when we are unsure. However, it is not necessary to turn completely around to resolve front/back ambiguity. Suppose that a sound source is located anywhere in the vertical median plane. Because our bodies are basically symmetrical about this plane, the sounds reaching the two ears will be essentially the same. But suppose that we turn our heads a small amount to the left. If the source were actually in front, the sound would now reach the right ear before reaching the left ear, whereas if the source were in back, the opposite would be the case. This change in the interaural time difference is often sufficient to resolve the front/back ambiguity.

But notice what happens with a standard binaural recording. When the source is directly ahead, we receive the same signal in both the left and the right ears. Because the recording is unaware of the listener's motion, the two signals continue to be the same when we move our heads. Now, if you ask yourself where a sound source could possibly be if the sounds in the two ears remain identical regardless of head motion, the answer is "inside your head." Dynamic cues are very powerful. Standard binaural recordings do not account for such dynamic cues, which is a major reason for the "frontal collapse."

One way to fix these problems is to use a servomechanism to make the dummy head turn when the listener's head turns. Indeed, such a system was implemented by Horbach et al. (U. Horbach, A. Karamustafaoglu, R. Pellegrini, P. Mackensen and G. Theile, "Design and applications of a data-based auralization system for surround sound," Preprint 4976, 106th Convention of the Audio Engineering Society (Munich, Germany, May 8-11, 1999)). They reported that their system produced extremely natural sound, and virtually eliminated front/back confusions. Although their system was very effective, it is clearly limited to use by only one listener at a time, and it cannot be used at all for recording.

There are also many Virtual-Auditory-Space systems (VAS systems) that use head-tracking methods to achieve the following advantages in rendering computer-generated sounds: (i) stable locations for virtual auditory sources, independent of the listener's head motion; (ii) good frontal externalization; and (iii) little or no front/back confusion. However, VAS systems require: (i) isolated signals for each sound source; (ii) knowledge of the location of each sound source; (iii) as many channels as there are sources; (iv) head-related transfer functions (HRTFs) to spatialize each source separately; and (v) additional signal processing to approximate the effects of room echoes and reverberation.

It is possible to apply VAS techniques to recordings intended to be heard through loudspeakers, such as stereo or surround-sound recordings. In this case, the sound sources (the loudspeakers) are isolated, and their number and locations are known. The recordings provide the separate channels and the sound sources are simulated loudspeakers located in a simulated room. The VAS system renders these sound signals just as they would render computer generated signals. Indeed, there are commercial products (such as the Sony MDR-DS8000 headphones) that employ head tracking to surround-sound recordings in just this way. However, the best that such systems can do is to recreate through headphones the experience of listening to the loudspeakers.

They are not readily applicable to live recordings, and are totally inappropriate for teleconferencing. They inherit all of the many problems of surround-sound and Ambisonic systems, save for the need for multiple loudspeakers.

There are also many methods for recording and reproducing live spatial sound using more than two microphones. However, we know of only one system for capturing live sound that is designed for headphone playback and that responds to dynamic motions of the listener. That system, which we refer to as the McGrath system, is described in U.S. Pat. Nos. 6,021,206 and 6,259,795. The primary difference between these patents is that the first concerns a single listener, while the second concerns multiple listeners. Both of these patents concern the binaural spatialization of recordings made with the SoundField microphone (F. Rumsey, *Spatial Audio* (Focal Press, Oxford, 2001), pp. 204-205).

The McGrath system has the following characteristics (i) when the sound is recorded, the orientation of the listener's head is unknown; (ii) the position of the listener's head is measured with a head tracker; (iii) a signal processing procedure is used to convert the multichannel recording to a binaural recording; and (iv) the main goal is to produce virtual sources whose locations do not change when the listener moves his or her head. Note that Ambisonic recording as used in the McGrath system attempts to capture the sound field that would be developed at a listener's location when the listener is absent; it does not capture the sound field at a listener's location when the listener is present. Nor does Ambisonic recording directly capture interaural time differences, interaural level differences, and spectral changes introduced by the head-related transfer function (HRTF) for a spherical-head. Thus, the McGrath system must use the recorded signals to reconstruct incoming waves from multiple directions and use HRTFs to spatialize each incoming wave separately. Although the McGrath system can employ an individualized HRTF, the system is complex and the reconstruction still suffers from all of the limitations associated with Ambisonics.

BRIEF SUMMARY OF THE INVENTION

The present invention overcomes many of the foregoing limitations and solves the three most serious problems of static binaural recordings: (a) the sensitivity of the locations of virtual auditory sources to head turning; (b) the weakness of median-plane externalization; and (c) the presence of serious front/back confusion. Furthermore, the invention is applicable for one listener or for many listeners listening at the same time, and for both remote listening and recording. Finally, the invention provides a "universal format" for recording spatial sound in the following sense. The sounds generated by any spatial sound technology (e.g., stereo, quadraphonics, Dolby 6.1, Ambisonics, wave-field synthesis, etc.) can be transformed into the format of the present invention and subsequently played back to reproduce the same spatial effects that the original technique could provide. Thus, the substantial legacy of existing recordings can be preserved with little or no loss in quality.

In general terms, the present invention captures the dynamic three-dimensional characteristics of spatial sound. Referred to herein as "Motion-Tracked Binaural" and abbreviated as "MTB", the invention can be used either for remote listening (e.g., telephony) or for recording and playback. In effect, MTB allows one or more listeners to place their ears in the space where the sounds either are occurring (for remote listening) or were occurring (for recording). Moreover, the invention allows each listener to turn his or her head independently while listening, so that different listeners can have their heads oriented in different directions. In so doing, the invention correctly and efficiently accounts for the perceptually very important effects of head motion. MTB achieves a high degree of realism by effectively placing the listener's ears in the space where the sounds are (or were) occurring, and moving the virtual ears in synchrony with the listener's head motions.

To accomplish this, the invention uses multiple microphones positioned over a surface whose size is approximately that of a human head. For simplicity, one can assume that the surface on which the microphones are mounted is a sphere. However, the invention is not so limited and can be implemented in various other ways. The microphones can cover the surface uniformly or nonuniformly. Furthermore, the number of microphones required is small.

The microphone array is typically placed at a location in the listening space where a listener presumably would like to be. For example, for teleconferencing, it might be placed in the center of the conference table. For orchestral recording, it might be placed at the best seat in the concert hall. For home theater, it might be placed in the best seat in a state-of-the-art cinema. The sounds captured by the microphones are treated differently for remote listening than for recording. In a remote-listening application, the microphone signals are sent directly to the listener whereas, in a recording application, the signals are stored in a multi-track recording.

Each listener is equipped with a head tracker to measure his or her head orientation dynamically. The origin of coordinates for the listener's head is always assumed to be coincident with the origin of coordinates for the microphone array. Thus, no matter how the listener moves, the sound reproduction system always knows where the listener's ears are located relative to the microphones. In one embodiment of the invention, the system finds the two microphones that are closest to the listener's ears and routes suitably amplified signals from those two microphones to a pair of headphones on the listener's head. As with the sound capture, there are many possible ways to implement the reproduction apparatus. In particular, it should be noted that although only headphone listening is described, it is also possible to employ so-called "crosstalk-cancellation" techniques to use loudspeakers instead of headphones (G. Gardner, *3-D Audio Using Loudspeakers* (Kluwer Academic Publishers, Boston, 1998), incorporated herein by reference).

In a preferred embodiment, a more elaborate, psychoacoustically-based signal processing procedure is used to allow a continuous interpolation of microphone signals, thereby eliminating any "clicks" or other artifacts from occurring as the listener moves his or her head, even with a small number of microphones.

In accordance with an aspect of the invention, the head tracker is used to modify the signal processing to compensate for the listener rotating his or her head. For simplicity, suppose that the listener turns his or her head through an angle θ in the horizontal plane, and consider the signal that is sent to a specific one of the listener's two ears. In one embodiment, the signal processing unit uses the angle θ to switch between microphones, always using the microphone that is nearest to the location of the listener's ear. In another embodiment, the signal processing unit uses the angle θ to interpolate or "pan" between the signal from the nearest microphone and the next nearest microphone. In still another embodiment, the signal processing unit uses linear filtering procedures that change with the angle θ to combine the signals from the nearest microphone and the next nearest microphone. In this third embodiment, a complementary signal, whose use is described below, is obtained either from a physical microphone or from a virtual microphone that combines the outputs of physical microphones. In one embodiment, the complementary signal is obtained from an additional microphone, distinct from those in the microphone array, but located in the same sound field. In another embodiment, the complementary signal is obtained from a particular one of the array microphones. In another embodiment, the complementary signal is obtained by dynamically switching between array microphones. In another embodiment, the complementary signal is obtained by spectral interpolation of the outputs of dynamically switched array microphones. In still another embodiment, two complementary signals are obtained, one for the left ear and one for the right ear, using any of the methods described above for a single complementary signal.

In accordance with an aspect of the invention, a sound reproduction apparatus comprises a signal processing unit having an output for connection to an audio output device and an input for connection to a head tracking device configured to provide a signal representing motion of the listener's head. The signal processing unit is configured to receive signals representative of the output of a plurality of microphones positioned to sample a sound field at points representing possible locations of a listener's ears if said listeners' head were positioned in said sound field and at the location of the microphones. The signal processing unit is further configured to select among the microphone output signals and present one or more selected signals to the audio output device in response to motion of the listener's head as indicated by the head tracking device. The audio output device and the head tracking device can be optionally connected directly to the signal processing unit or can be wireless.

In accordance with another aspect of the invention, the signal processing unit is configured to, in response to rotation of the listener's head as indicated by the head tracking device, combine signals representative of the output from a nearest microphone and a next nearest microphone in the plurality of microphones in relation to the position of the listener's ears in the sound field if the listener's head were positioned in the sound field, and to present the combined output to the audio output device.

In accordance with another aspect of the invention, the signal processing unit includes a low-pass filter associated with each of the microphone output signals, and means, such as a summer, for combining outputs of the low-pass filters to produce a combined output signal for the listener's left ear and a combined output signal for listener's right ear, wherein each combined output signal comprises a combination of signals representative of the output from the nearest microphone and the next nearest microphone in relation to the position of the listener's ear in the sound field if the listener's head were positioned in the sound field.

In accordance with another aspect of the invention, the signal processing unit includes a high-pass filter configured to provide an output from a real or virtual complementary microphone located in the sound field, and means such as a summer for combining the output signals from the high-pass filter with the combined output signals for the listener's right ear and with the combined output signals for the listener's left ear. In one embodiment, the same high-frequency signal is used for both ears. In another embodiment, a right-ear high-pass filter is configured to provide an output from a right-ear real or virtual complementary microphone located in the sound field, and a left-ear high-pass filter is configured to provide an output from a left-ear real or virtual complementary microphone located in the sound field. In this latter embodiment, the output signals from the right-ear high-pass filter are combined with the combined output signals for the listener's right ear, and the output signals from the left-ear high-pass filter are combined with the combined output signals for the listener's left ear.

In accordance with another aspect of the invention, a dynamic binaural sound capture and reproduction apparatus comprises a plurality of microphones positioned to sample a sound field at points representing possible locations of a listener's ears if the listener's head were positioned in the sound field. The signal processing unit can receive the microphone signals directly from the microphones, via signals transmitted across a communications link, or by reading and/or playing back media on which the microphone signals are recorded.

An object of the invention is to provide sound reproduction with a sense of realism that greatly exceeds current technology; that is, a real sense that "you are there." Another object of the invention is to accomplish this with relatively modest additional complexity, both for sound capture, storage or transmission, and reproduction.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus and methods generally shown in FIG. 1 through FIG. 11. It will be seen therefrom, as well as the description herein, that the preferred embodiment of the invention (1) uses more than two microphones for sound capture (although some useful effects can be achieved with only two microphones as will be discussed later); (2) uses a head-tracking device to measure the orientation of the listener's head; and (3) uses psychoacoustically-based signal processing techniques to selectively combine the outputs of the microphones.

Figure 1:
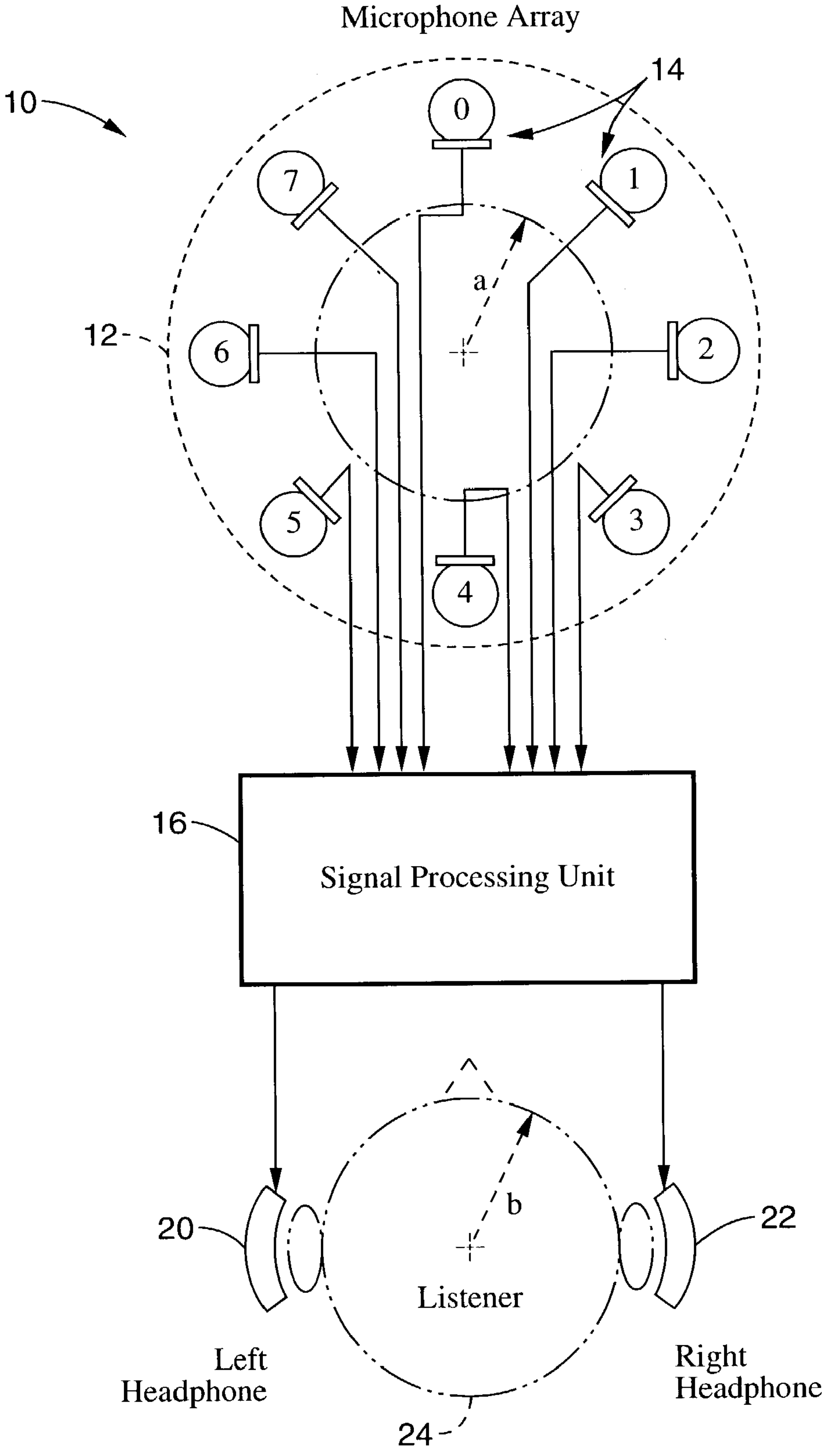
FIG. 1 is a schematic diagram of an embodiment of a dynamic binaural sound capture and reproduction system according to the present invention.
Figure 2:
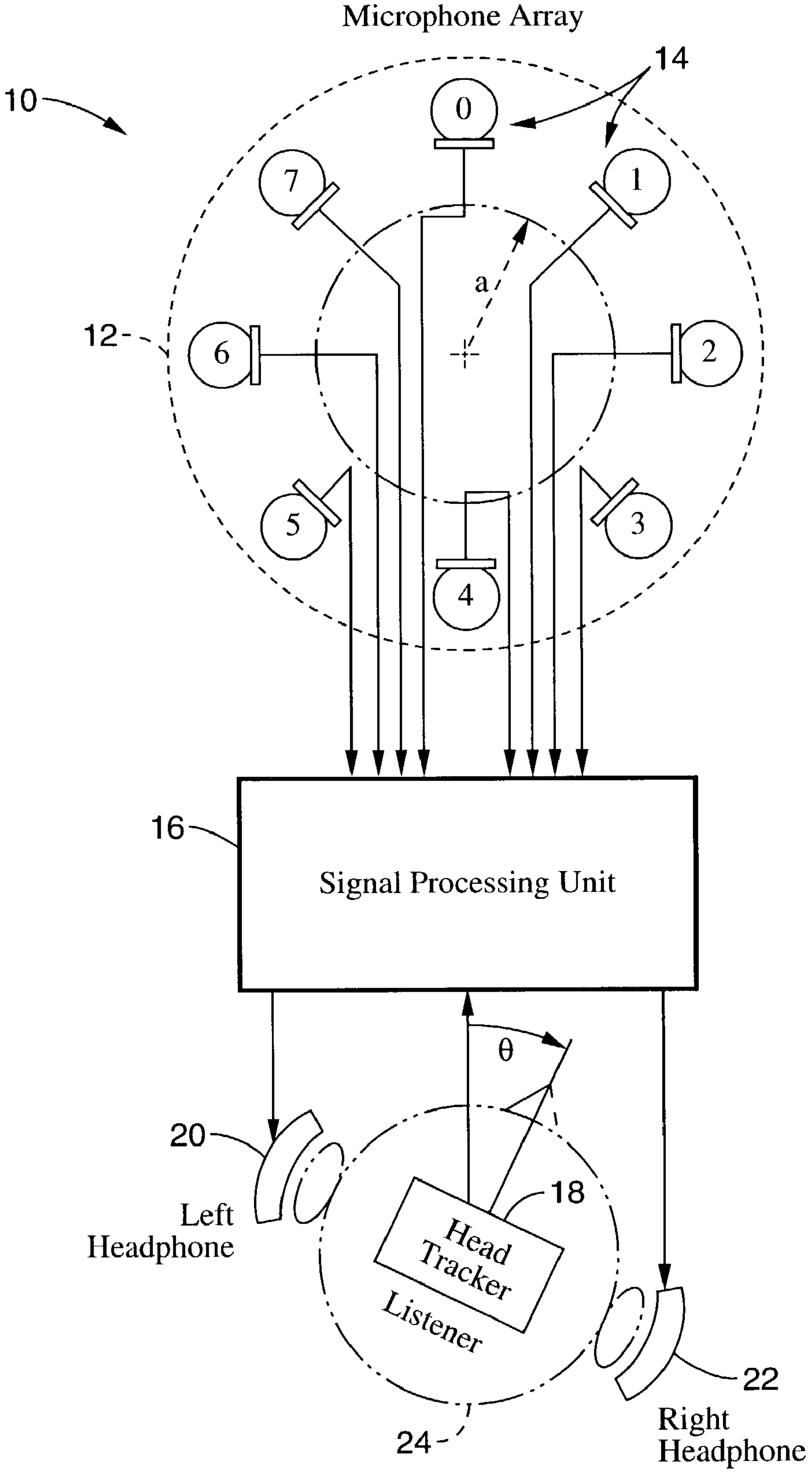
FIG. 2 is a schematic diagram of the system shown in FIG. 1 illustrating head tracking.

Referring first to FIG. 1 and FIG. 2, an embodiment of a binaural dynamic sound capture and reproduction system 10 according to the present invention is shown. In the embodiment shown, the system comprises a circular-shaped microphone array 12 having a plurality of microphones 14, a signal processing unit 16, a head tracker 18, and an audio output device such as left 20 and right 22 headphones. The microphone arrangement shown in these figures is called a panoramic configuration. As will be discussed later, there are three different classes of applications, which we call omnidirectional, panoramic, and focused applications. By way of example only, the invention is illustrated in the following discussion for a panoramic application.

In the embodiment shown, microphone array 12 comprises eight microphones 14 (numbered 0 to 7) equally spaced around a circle whose radius a is approximately the same as the radius b of a listener's head 24. It should be appreciated that an object of the invention is to give the listener the impression that he or she is (or was) actually present at the location of the microphone array. In order to do so, the circle around which the microphones are placed should be approximate the size of a listener's head.

Eight microphones are used in the embodiment shown. In this regard, note that the invention can function with as few as two microphones as well as with a larger number of microphones. Use of only two microphones, however, does not yield as real a sensory experience as with eight microphones, producing its best effects for sound sources that are close to the interaural axis. And, while more microphones can be used, eight is a convenient number since recording equipment with eight channels is readily available.

The signals produced by these eight microphones are combined in the signal processing unit 16 to produce two signals that are directed to the left 20 and right 22 headphones. For example, with the listener's head in the orientation shown in FIG. 1, the signal from microphone #6 would be sent to the left ear, and the signal from microphone #2 would be sent to the right ear. This would be essentially equivalent to what is done with standard binaural recordings.

Now consider the situation illustrated in FIG. 2 where the listener has rotated his or her head through an angle θ. This angle is sensed by the head tracker 18 and then used to modify the signal processing. Head trackers are commercially available and the details of head trackers will not be described. It is sufficient to note that a head tracker will produce an output signal representative of rotational movement. If the angle θ were an exact multiple of 45°, the signal processing unit 16 would merely select the pair of microphones that were in register with the listener's ears. For example, if θ were exactly 90°, the signal processing unit 16 would direct the signal from microphone #0 to the left ear and the signal from microphone #4 to the right ear. In other words, the signal processing unit 16 would select the microphone pairs having positions corresponding to a 90° counterclockwise rotation through the microphone array relative to the "head straight" position shown in FIG. 1. In general, however, θ is not an exact multiple of 45°, and the signal processing unit 16 must combine the microphone outputs to provide the signals for the headphones as will be described below.

It will be appreciated that the head tracker provides signals representing changes in the orientation of the listener's head relative to a reference orientation. Orientation is usually represented by three Euler angles (pitch, roll and yaw), but other angular coordinates can also be used. Measurements are preferably made at a high sampling rate, such as one-hundred times per second, but other rates can be used as well.

The reference orientation, which defines the "no-tilt, no-roll, straight-ahead" orientation, will typically be initialized at the beginning of the process, but could be changed by the listener whenever desired. Referring to FIG. 1, suppose that the listener's left ear is at the location of microphone #6 and that the listener's right ear is at the location of microphone #2. Thereafter, if the listener walks about without turning, the listener's location (and the xyz-locations of the listener's ears) would have no effect on the sound reproduction. On the other hand, if the listener turns his or her head, thereby changing the locations of his or hers ears relative to their initial positions in a coordinate system whose origin is always at the center of the listener's head and whose orientation never changes, signal processing unit 16 would compensate for that change in orientation as illustrated in the FIG. 2.

In general, when a listener moves about, there is both a translational and a rotational component of the motion. It will be appreciated that the MTB system ignores the translational component. The center of the listener's head is always assumed to be coincident with the center of the MTB microphone array. Thus, no matter how the listener moves, the signals provided by head tracker 18 allow signal processing unit 16 to always know where the "location" of the listener's ears relative to the microphones. While the term "location" is often understood to mean the absolute position of a point in space (e.g., its xyz-coordinates in some defined reference frame), it is important to note that the MTB system of the present invention does not need to know the absolute locations of the listener's ears, only their relative locations.

Figure 3:
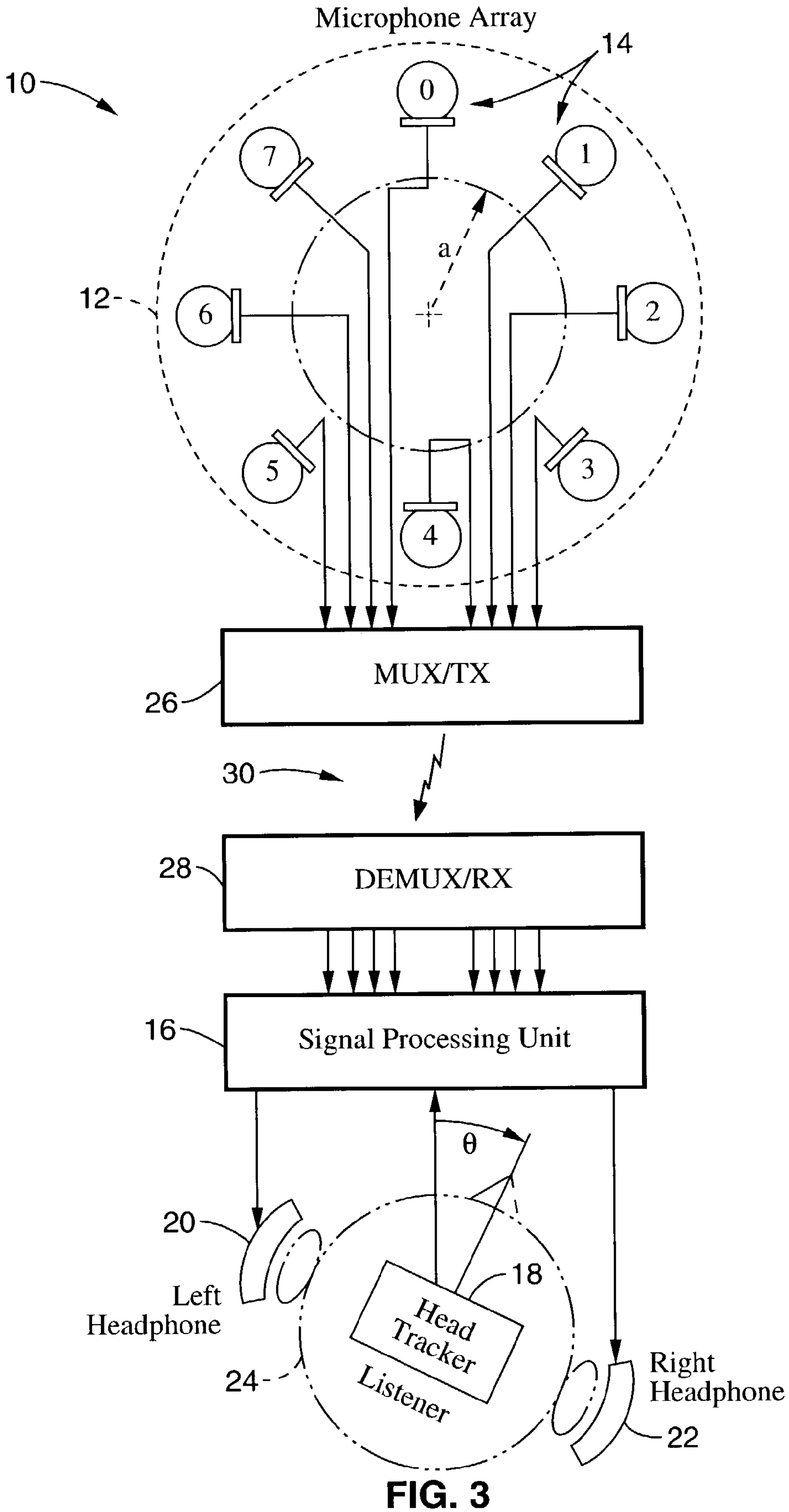
FIG. 3 is a schematic diagram of an embodiment of the system shown in FIG. 2 configured for teleconferencing.
Figure 4:
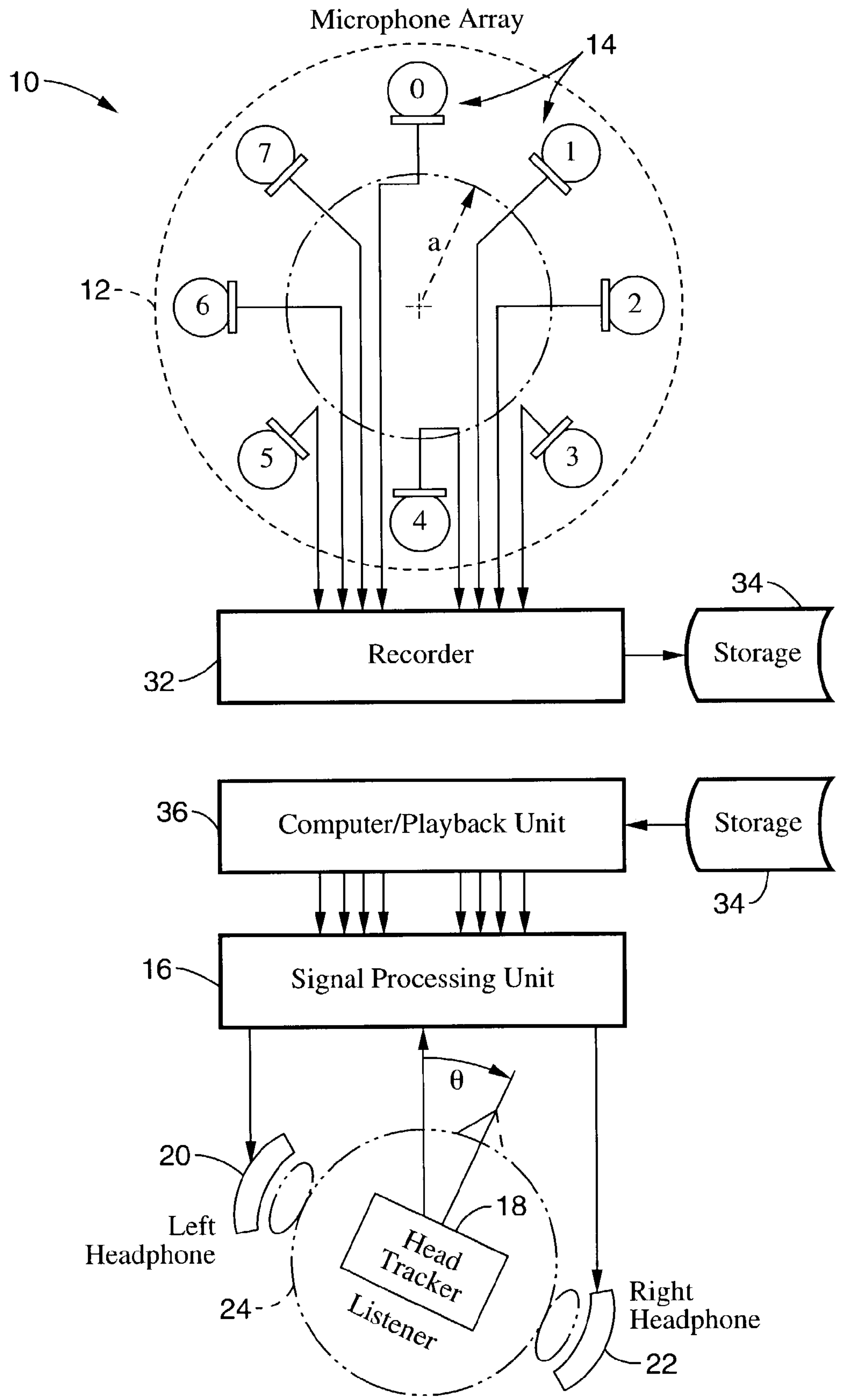
FIG. 4 is a schematic diagram of an embodiment of the system shown in FIG. 2 configured for recording and playback.

Before describing how signal processing unit 16 combines the microphone signals to account for head rotation, it should be noted that FIG. 1 and FIG. 2 depict the microphone outputs directly feeding signal processing unit 16. However, this direct connection is shown for illustrative purposes only, and need not reflect the actual configuration used. For example, FIG. 3 illustrates a teleconferencing configuration. In the embodiment shown, the microphone outputs feed a multiplexer/transmitter unit 26 which transmits the signals to a remotely located demultiplexer/receiver unit 28 over a communications link 30. The communications link could be a wireless link, optical link, telephone link or the like. The result is that the listener experiences the sound picked up from the microphones as if the listener was actually located at the microphone location. FIG. 4, on the other hand, illustrates a recording configuration. In the embodiment shown, the microphone outputs feed a recording unit 32 which stores the recording on a storage media 34 such as a disk, tape, a memory card, CD-ROM or the like. For later playback, the storage media is accessed by a computer/playback unit 36 which feeds signal processing unit 16.

As can be seen, therefore, signal processing unit 16 requires an audio input and the input can be in any conventional form such as a jack, wireless input, optical input, hardwired connection, and so forth. The same is true with regard to the input for head tracker 18 as well as the audio output. Thus, it will be appreciated that connections between signal processing unit 16 and other devices, and that the terms "input" and "output" as used herein, are not limited to any particular form.

Figure 5:
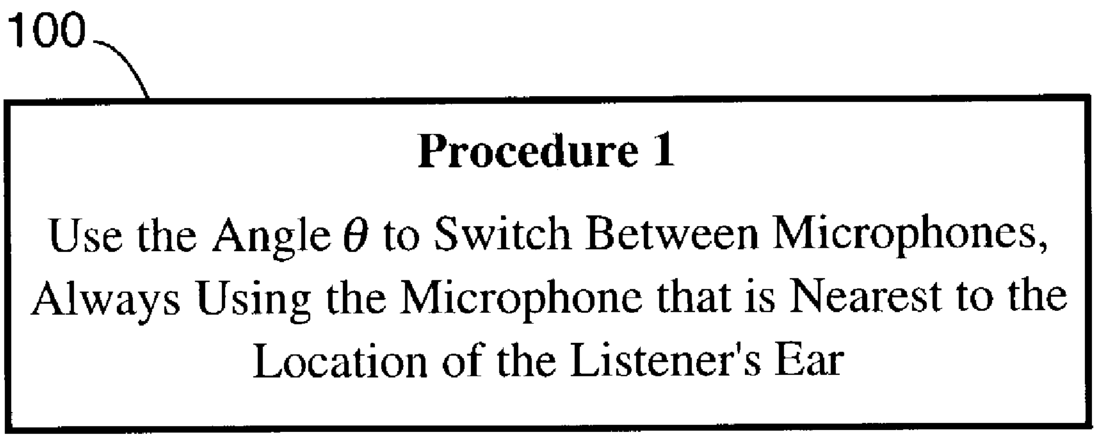
FIG. 5 is a diagram showing a first embodiment of a method of head tracking according to the present invention.
Figure 6:
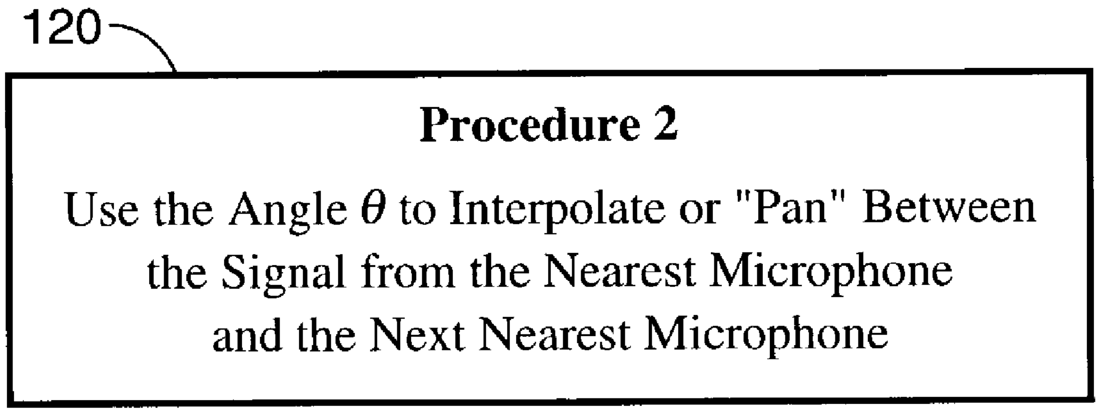
FIG. 6 is a diagram showing a second embodiment of a method of head tracking according to the present invention.
Figure 7A:
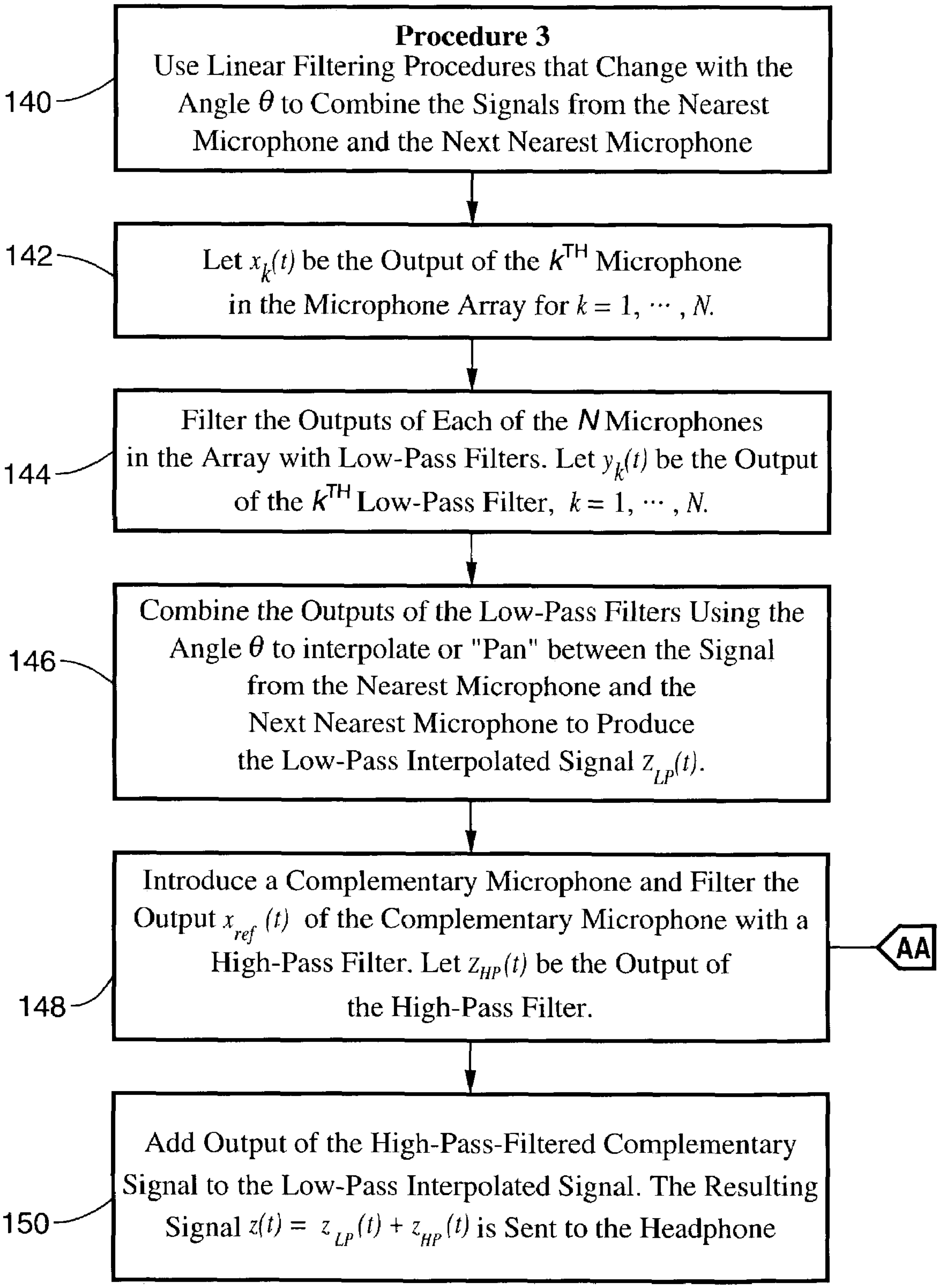
FIG. 7 is a diagram showing a third embodiment of a method for head tracking according to the present invention.
Figure 8A:
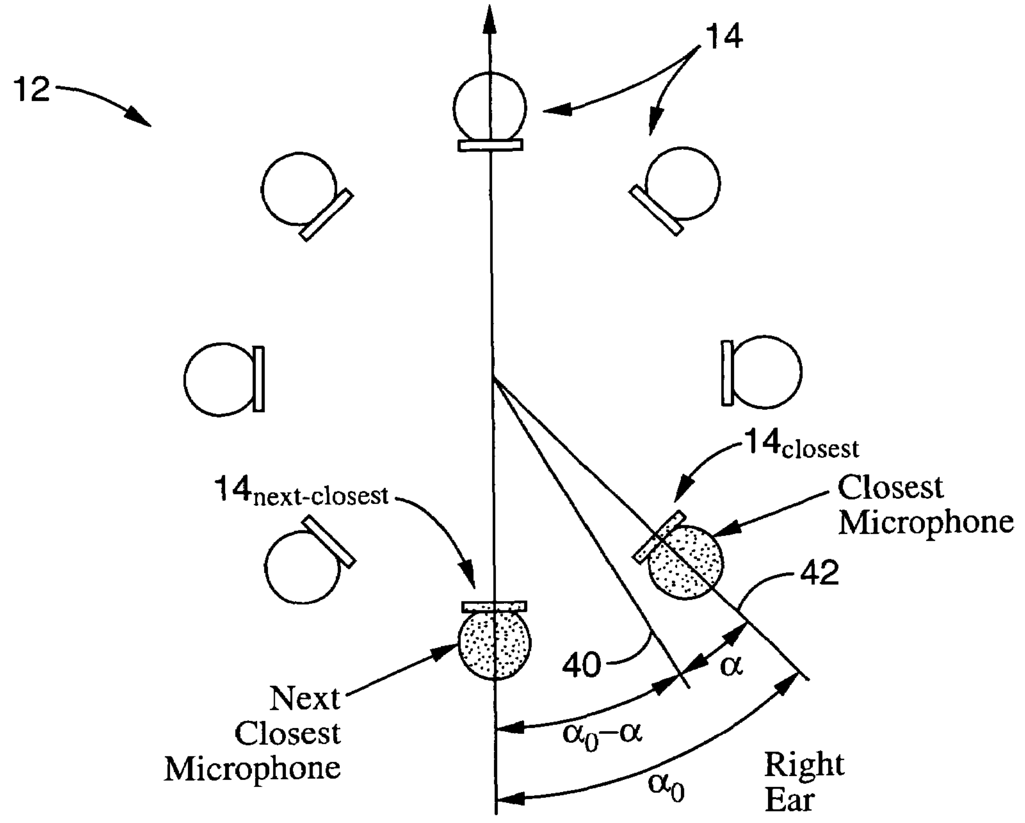
FIG. 8 is a schematic diagram illustrating head tracking according to the method illustrated in FIG. 7.
Figure 8B:
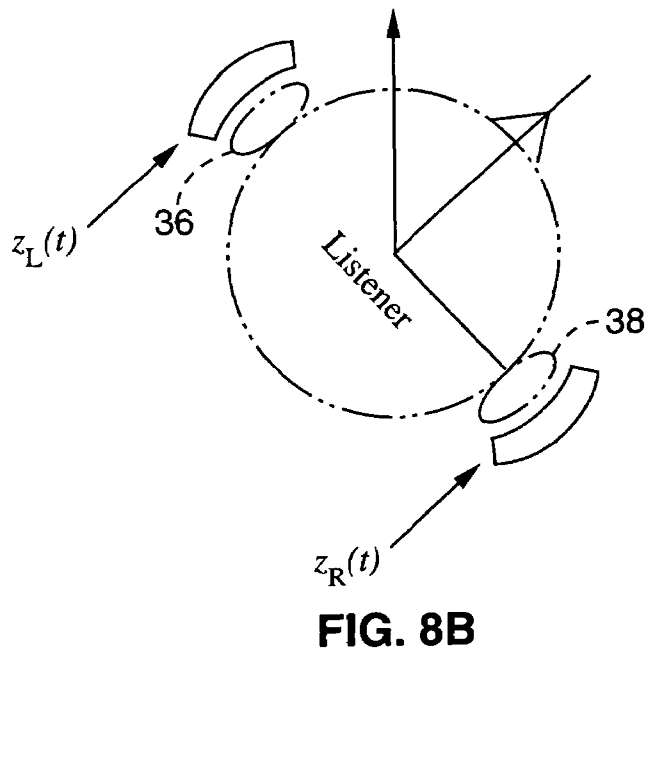
Figure 9:
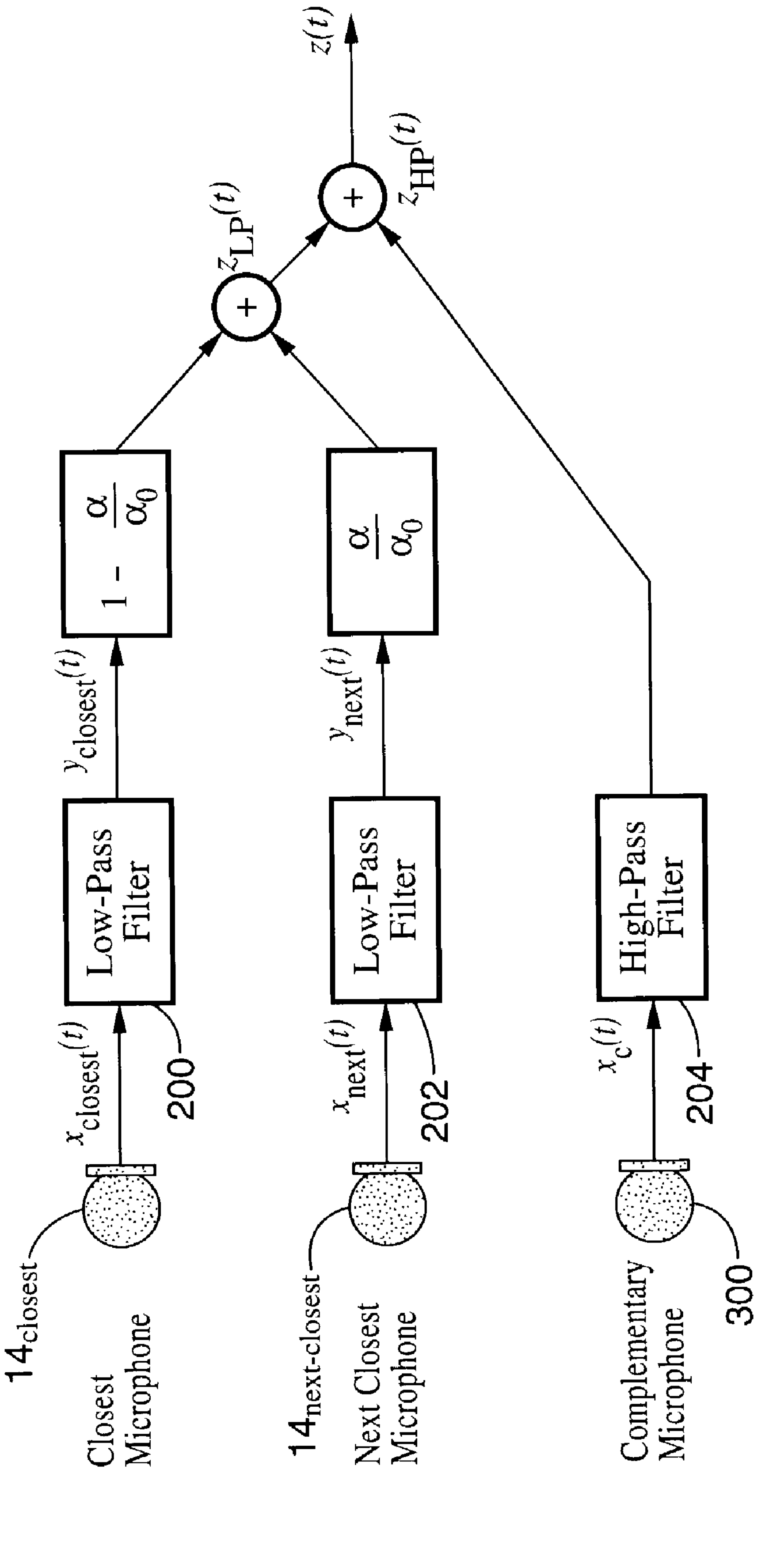
FIG. 9 is a block diagram showing an embodiment of signal processing associated with the method of head tracking illustrated in FIG. 7 and FIG. 8.

Referring now to FIG. 5 through FIG. 7, we now describe different procedures for combining the microphone signals in accordance with the present invention. For simplicity, the descriptions are given for only one ear, with the understanding that the same procedure is to be applied to the other ear, mutatis mutandis. Each of these procedures is useful in different circumstances, and each is discussed in turn.

One such procedure 100 is shown in FIG. 5 and referred to herein as Procedure 1. In this procedure, the signal processing unit 16 would use the angle $\theta$0 to switch between microphones, always using the microphone that is nearest to the location of the listener's ear. This is the simplest procedure to implement. However, it is insensitive to small head movements, which either degrades performance or requires a large number of microphones, thereby increasing the complexity. In addition, switching would have to be combined with sophisticated filtering to prevent audible clicks. Possible "chatter" that would occur when the head orientation moves back and forth across a switching boundary can be eliminated by using the standard hysteresis switching technique.

Another such procedure 120 is shown in FIG. 6 and referred to herein as Procedure 2. In this procedure, the signal processing unit 16 would use the angle $\theta$ to interpolate or "pan" between the signal from the nearest microphone and the next nearest microphone. Procedure 2, which is to pan between the microphones, is sensitive to small head movements, and is suitable for some applications. It is based on essentially the same principle that is exploited in amplitude-panned stereo recordings to produce a phantom source between two loudspeakers (B. J. Bauer, "Phasor analysis of some stereophonic phenomena," *J. Acoust. Soc. Am.*, Vol. 33, No. 11, pp. 1536-1539 (November, 1961)). To express this principle mathematically, let x(t) be the signal at time t picked up by the nearest microphone, and let x(t−T) be the signal picked up by the next nearest microphone, where T is the time it takes for the sound wave to propagate from one microphone to the other. For simplicity, we are ignoring any changes in the waveform due to diffraction of the incident wave as it travels around the mounting surface. These changes will be relatively small if the microphones are reasonably near one another.

If x(t) contains no frequencies above some frequency $f_{max}$, if the time delay T is less than roughly $1/(4f_{max})$, and if the coefficient w is between 0 and 1, then it can be shown that $(1-w)x(t)+wx(t-T)\approx x(t-wT)$. Thus, by changing the panning coefficient w according to the angle between a ray to the ear and a ray to the nearest microphone, one can obtain a signal whose time delay is correspondingly between the time delays of the signals from the two microphones.

There are two sources of error in Procedure 2. The first is the breakdown in the approximation when $T>1/(4f_{max})$. The second is the spectral coloration that occurs whenever the outputs of two microphones are linearly combined or "mixed."

The resulting limitations on the signals can be expressed in terms of the number N of microphones in the array. Let a be the radius of the circle, c be the speed of sound, and d be the distance between two adjacent microphones. Then, because $d=2a\sin(\pi/N)\approx 2\pi a/N$ and because the maximum value of T is d/c, it follows that the approximation breaks down if the signal contains significant spectral content above $f_{max}\approx Nc/(8\pi a)$. (Note that the assumption that T=d/c corresponds to a worst-case situation in which the sound source is located along the line joining the two microphones. If the direction to the sound source is orthogonal to the line between the microphones, the wavefronts arrive at the microphones at the same time and there is no error. However, the worst-case situation is a common one, occurring, for example, when a source is directly ahead and the listener rotates his or her head to a position where the ears are halfway between the closest microphones. We note in passing that the condition that $T=d/c<1/(4f_{max})$ is equivalent to the condition that d be less than a quarter wavelength. Sampling theory suggests that what we are doing with the microphones is sampling the acoustic waveform in space, and that the breakdown in the approximation can be interpreted as being a consequence of aliasing when the spatial sampling interval is too large).

Using the numerical values a=0.0875 m, c=343 m/s, and N=8, we obtain $f_{max}\approx 1.25$ kHz. In other words, with an 8-microphone array, the mixing will fail to produce a properly delayed signal if there is significant spectral content above 1.25 kHz. This limit can be raised by decreasing the distance between microphones. When the outputs of two microphones are linearly combined, differences in the arrival times also introduce a comb-filter pattern into the spectrum that can be objectionable. The lowest frequency notch of the comb filter occurs at $f_0=c/(2d)$. Again assuming that $d\approx 2\pi a/N$, we obtain $f_0\approx Nc/(4\pi a)\approx 2f_{max}$. Because we would want to have $f_0$ be at least an octave above the highest frequency of interest, we see that both sources of error lead to essentially the same condition, viz., the requirement for no significant spectral content above $f_{max}\approx Nc/(8\pi a)$. Table 1 shows how this frequency varies with N when a=0.0875 m and c=343 m/s.

If the signals have no significant spectral energy above $f_{max}$, Procedure 2 produces excellent results. If the signals have significant spectral energy above $f_{max}$ and if $f_{max}$ is sufficiently high (above 800 Hz), Procedure 2 may still be acceptable. The reason is that human sensitivity to interaural time differences declines at high frequencies. This means that the breakdown in the approximation ceases to be relevant. It is true that spectral coloration becomes perceptible. However, for applications such as surveillance or teleconferencing, where "high-fidelity" reproduction may not be required, the simplicity of Procedure 2 may make it the preferred choice.

A third, and the overall preferred procedure 140 is illustrated in FIG. 7 and referred to herein as Procedure 3. In this procedure, the signal processing unit 16 uses linear filtering procedures that change with the angle θ to combine the signals from the nearest microphone and the next nearest microphone.

Procedure 3 combines the signals using psychoacoustically-motivated linear filtering. There are at least two ways to solve the problems caused by spatial sampling. One is to increase the spatial sampling rate; that is, increase the number of microphones. The other is to apply an anti-aliasing filter before combining the microphone signals, and somehow restore the high frequencies. The latter approach is the preferred embodiment of Procedure 3.

Procedure 3 takes advantage of the fact that humans are not sensitive to high-frequency interaural time difference. For sinusoids, interaural phase sensitivity falls rapidly for frequencies above 800 Hz, and is negligible above 1.6 kHz (J. Blauert, *Spatial Hearing* (Revised Edition), p. 149 (MIT Press, Cambridge, Mass., 1996), incorporated herein by reference). Referring to FIG. 7 as well as to FIG. 8 and FIG. 9, the following is an example of processing steps associated with Procedure 3 for an N-microphone array, with N=8 in this embodiment:

1. At block 142, let $x_k(t)$ be the output of the $k^{th}$ microphone in the microphone array for k=1, . . . , N.

2. At block 144, filter the outputs of each of the N microphones (e.g., eight microphones in this embodiment) in the array with low-pass filters having a sharp roll off above a cutoff frequency $f_c$ in the range between approximately 1.0 and 1.5 kHz. Let $y_k(t)$ be the output of the $k^{th}$ low-pass filter, k=1, . . . , N.

3. At block 146, combine the outputs of these filters as in Procedure 2 to produce the low-pass output $z_{LP}(t)$. For example, consider the right-ear signal. Let α be the angle between the ray 40 to the right ear 38 and the ray 42 to the closest microphone $\mathbf{14}_{closest}$, and let $\alpha_0$ be the angle between the rays to two adjacent microphones; e.g., microphone $\mathbf{14}_{closest}$ and microphone $\mathbf{14}_{next\_closest}$ in this example. Let $y_{closest}(t)$ be the output of the low-pass filter 200 for the closest microphone $\mathbf{14}_{closest}$, let $y_{next}(t)$ be the output of the low-pass filter 202 for the next closest microphone $\mathbf{14}_{next\_closest}$. Then the low-pass output for the right-ear is given by $z_{LP}(t)=(1-\alpha/\alpha_0)y_{closest}(t)+(\alpha/\alpha_0)y_{next}(t)$. The low-pass output for the left ear 36 is produced similarly and, since the processing elements for the left-ear signal are duplicative of those described above, they have been omitted from FIG. 9 for purposes of clarity.

4. At block 148, we introduce a complementary microphone 300. The output $x_c(t)$ of the complementary microphone is filtered with a complementary high-pass filter 204. Let $z_{HP}(t)$ be the output of this high-pass filter. The complementary microphone might be a separate microphone, one of the microphones in the array, or a "virtual" microphone created by combining the outputs of the microphones in the array. Additionally, different complementary microphones can be used for the left ear and the right ear. Various alternative embodiments of the complementary microphone(s) and the advantages and disadvantages of these alternatives are discussed below.

5. Next, at block 150, the output of the high-pass-filtered complementary signal is added to the low-pass interpolated signal and the resulting signal, $z(t)=z_{LP}(t)+z_{HP}(t)$, is sent to the headphone. Once again, it should be observed that the signals for the right and left ears must be processed separately. In general, the signals $z_{LP}(t)$ are different for the left and right ears. For Alternatives A, B and C below, the signals $z_{HP}(t)$ are the same for the two ears, but for Alternative D they are different.

It will be appreciated that the signal processing described above would be carried out by signal processing unit 16, and that conventional low-pass filters, high-pass filter(s), adders and other signal processing elements would be employed. Additionally, signal processing unit 16 would comprise a computer and associated programming for carrying out the signal processing.

It should be noted that Procedure 3 produces excellent results. Although it is more complex to implement than Procedure 1 and Procedure 2, it is our preferred embodiment for high-fidelity reproduction because this procedure will produce a signal faithfully covering the full spectral range. While the interaural time difference (ITD) for spectral components above $f_c$ is not controlled, the human ear is insensitive to phase above this frequency. On the other hand, the ITD below $f_c$ will be correct, leading to the correct temporal localization cues for sound in the left/right direction.

Above $f_c$, the interaural level difference (ILD) provides the most important localization cue. The high-frequency ILD depends on exactly how the complementary microphone signal is obtained. This is discussed later, after the physical mounting and configuration of the microphones, which will now be discussed.

As was mentioned earlier, the microphones in the microphone array can be physically mounted in different ways. For example, they could be effectively suspended in space by supporting them by stiff wires or rods, they could be mounted on the surface of a rigid sphere, or they could be mounted on any surface of revolution about a vertical axis, such as a rigid ellipsoid or a truncated cylinder or an octagonal box.

It is also important to note that, while the embodiments described above employ an array of microphones, it is not necessary to space the microphones uniformly.

In accordance with the invention, we also distinguish three different classes of applications, which we call omnidirectional, panoramic, and focused applications. Thus far, the embodiments described have been in the context of panoramic applications.

Figure 10:
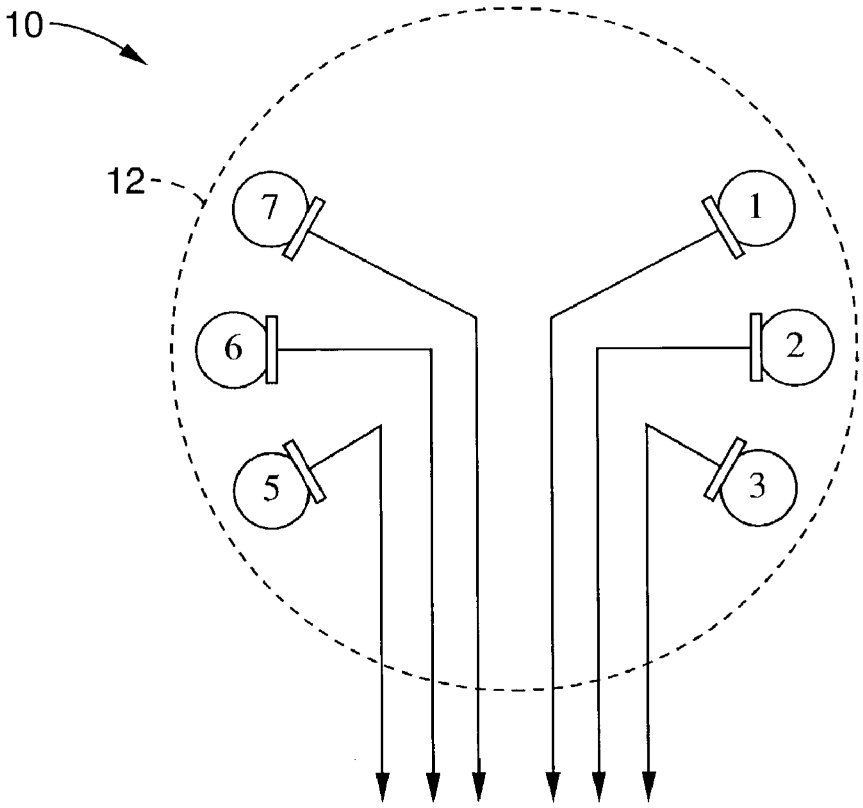
FIG. 10 is a schematic diagram of a focused microphone configuration according to the present invention.

With omnidirectional applications, the listener has no preferred orientation, and the microphones should be spaced uniformly over the entire surface (not shown). With panoramic applications as described above, the vertical axis of the listener's head usually remains vertical, but the listener is equally likely to want to turn to face any direction. Here the microphones are spaced, preferably uniformly, around a horizontal circle as illustrated above. With focused applications (typified by concert, theater, cinema, television, or computer monitor viewing), the user has a strongly preferred orientation. Here the microphones can be spaced more densely around the expected ear locations as illustrated in FIG. 10 to reduce the number of microphones needed or to allow the use of a higher cutoff frequency.

Each of these alternatives classes of applications and microphone configurations and mounting surfaces will produce different inter-microphone time delays and different spectral colorations. In particular, the free-space suspension will lead to shorter time delays than either of the surface-mounted choices, leading to a requirement of a larger radius. With the surface mounted choices, the microphone pickup will no longer be omnidirectional. Instead, it will inherit the sound scattering characteristics of the surface. For example, for a spherical surface or a truncated cylindrical surface, the high-frequency response will be approximately 6-dB greater than the low-frequency response for sources on the ipsilateral side of the microphone, and the high-frequency response will be greatly attenuated by the sound shadow of the mounting surface for sources on the contralateral side. Note also that effect of the mounting surface can be exploited to capture the correct interaural level differences as well as the correct interaural time differences.

It is worth observing that different mounting configurations can lead to different requirements for the head-tracker. For example, both azimuth and elevation must be tracked for omnidirectional applications. For panoramic applications, the sound sources of interest will be located in or close to the horizontal plane. In this case, no matter what surface is used for mounting the microphones, it may be preferable to position them around a horizontal circle. This would enable the use of a simpler head tracker that measures only the azimuth angle.

Heretofore, we have tacitly assumed that the microphone array is stationary. However, there is no reason why an MTB array could not be mounted on a vehicle, a mobile robot, or even a person or an animal. For example, the signals from a person wearing a headband or a collar bearing the microphones could be transmitted to other listeners, who could then experience what the moving person is hearing. For mobile applications, it may be advantageous to incorporate a position tracker in the MTB array. That way, if the array is rotated as well as translated, the rotation of the MTB array can be combined with any rotation of the listener's head to maintain rotationally stabilized sound images.

We have said that the size of the mounting surface should be close to that of the listener's head. However, there are also possible underwater applications of MTB. Because the speed of sound in water is approximately 4.2 times the speed of sound in air, the size of the mounting surface should be scaled accordingly. That will correct for both the changes in interaural time difference and interaural level difference introduced by the medium. For underwater remote listening, the listener could be on land, on a ship, or also in the water. In particular, a diver could have an MTB array included in his or her diving helmet. It is well known that divers have great difficulty locating sound sources because of the unnaturally small interaural time and level differences that are experienced in water. A helmet-mounted MTB array can solve this problem. If the diver is the only listener, and if the helmet turns with the diver's head, it is sufficient to use two microphones, and head tracking can be dispensed with. However, if others want to hear what the diver hears, or if the diver can turn his or her head inside the helmet, a multiple-microphone MTB array is needed. Finally, as with other mobile applications, it is desirable to use a tracker attached to the MTB array to maintain rotationally stabilized sound images.

Although a sphere might seem to be the ideal mounting surface, particularly for omnidirectional applications, other surfaces may actually be preferable. The extreme symmetry of a sphere results in the development of a "bright spot," which is an unnaturally strong response on the side of the sphere that is diametrically opposite the sound source. An ellipsoid or a truncated cylinder has a weaker bright spot. Practical fabrication and assembly considerations favor a truncated cylinder, and even a rectangular, hexagonal, or octagonal box might be preferred. However, for simplicity, for the rest of this document it is assumed that the array microphones are mounted on a rigid sphere.

As we noted above, a microphone mounted on a surface inherits the sound scattering characteristics of the surface. The resulting anisotropy in the response behavior is actually desirable for the array microphones, because it leads to the proper interaural level differences. However, the anisotropy may create a problem for the complementary microphone which carries the high-frequency information, if we want that information to be independent of the direction from the microphone to the sound source. This brings us to consider alternative ways to implement the complementary microphone used in Procedure 3.

The purpose of the complementary microphone is to restore the high-frequency information that is removed by the low-pass filtering of the N array microphone signals. Referring to FIG. 7B, as illustrated in block 152, there are at least five ways to obtain this complementary microphone signal, each with its own advantages and disadvantages.

Alternative A: Use a separate complementary microphone. Here, a separate microphone is used to pick up the high-frequency signals. For example, this could be an omnidirectional microphone mounted at the top of the sphere. Although the pickup would be shadowed by the sphere for sound sources below the sphere, it would provide uniform coverage for sound sources in the horizontal plane.

Advantages (1) Conceptually simple.

(2) Bandwidth efficient. Although the complementary microphone requires the full audio bandwidth (22.05 kHz for CD quality), each of the N array microphones requires a bandwidth of only $f_c$. For example, if N=8 and $f_c$=1.5 kHz, the 8 array microphones together require a bandwidth of only 12 kHz. Thus, the entire system requires no more bandwidth than a normal two-channel stereo CD.

Disadvantages (1) Requires another channel. This is a drawback for the otherwise attractive case of N=8 array microphones, because eight-track recorders and eight-channel A/D converters are common commercial products, but now nine channels are needed.

(2) Anisotropy. There is no place where a physical complementary microphone can be placed without having it be in the shadow of the sphere for some half of space.

(3) Incorrect ILD. When the same high-frequency signal is used for both the left and the right ears, there will be no high-frequency interaural level difference (ILD). Although this causes no problems for sound sources with no high-frequency energy, sound sources with no low-frequency energy will tend to be localized at the center of the listener's head. In addition, there will be conflicting cues for broad-band sources. This typically increases localization blur, and can lead to the formation of "split images"; that is, the perception that there are two sources, a low-frequency source where it should be, and a high-frequency source at the center of the head.

Alternative B: Use one of the array microphones. Arbitrarily select one of the array microphones as the complementary microphone.

Advantages (1) Conceptually simple.
(2) Bandwidth efficient. (Same as for Alternative A).
(3) Avoids the need for an additional channel.

Disadvantages (1) Anisotropic for sources in the horizontal plane. Whichever microphone is selected for the complementary microphone, it will be in the sound shadow of the sphere for sources on the contralateral side. Although this might be acceptable or even desirable for focused applications, it may be unacceptable for omnidirectional or panoramic applications.

(2) Incorrect ILD. (Same as for Alternative A).

Alternative C: Use one dynamically-switched array microphone. Use the head-tracker output to select the microphone that is nearest the listener's nose.

Advantages (1) Avoids the need for additional channels.

(2) The anisotropic response can be used to obtain some additional improvement in front/back discrimination. The head shadow for sources in back will to some degree substitute for the missing "pinna shadow."

Disadvantages (1) No longer bandwidth efficient. Because there is no way to know which channel is being used for the complementary channel, all of the N channels will have to be transmitted or recorded at full audio bandwidth. However, bandwidth efficiency can be retained for a single-user application, such as surveillance, because the one full-bandwidth channel needed for that listener can be switched dynamically from microphone to microphone.

(2) Requires additional signal processing to eliminate switching transients, as is discussed for Alternative D.

(3) Incorrect ILD (Same as for Alternative A).

Alternative D: Create a virtual complementary microphone from two dynamically-switched array microphones. This option uses different complementary signals for the right ear and the left ear. For any given ear, the complementary signal is derived from the two microphones that are closest to that ear. This is very similar to the way in which the low-frequency signal is obtained. However, instead of panning between the two microphones (which would introduce unacceptable comb-filter spectral coloration), we switch between them, always choosing the nearer microphone. In this way, the sphere automatically provides the correct interaural level difference.

Advantages (1) Avoids the need for additional channels.
(2) Correct ILD.

Disadvantages (1) No longer bandwidth efficient. (Same as for Alternative C).

(2) Requires additional signal processing to reduce switching transients.

(3) The change in spectrum is audible. If the signal is just suddenly switched, the listener will usually hear clicks produced by the signal discontinuity. This will be particularly annoying if the head position is essentially on a switching boundary and signals are rapidly switched back and forth as small tremors cause the head to move back and forth across the switching boundary. The resulting rapid series of switching transients can produce a very annoying "chattering" sound. The chattering problem is easily solved by the standard technique of introducing hysteresis; once a switching boundary is crossed, the switching circuitry should require some minimum angular motion back into the original region before switching back. The inevitable discontinuity that occurs when switching from one microphone to another can be reduced by a simple cross-fading technique. Instead of switching instantly, the signal can be derived by adding a faded-out version of the first signal to a faded-in version of the second signal. The results will depend on the length of the time interval $T_{fade}$ over which the first signal is faded out and the second signal is faded in. Simulation experiments have shown that the switching transient is very faint when $T_{fade}$=10 ms and is inaudible when $T_{fade}$=20 ms. These numbers are quite compatible with the data rate for the head tracker, which is typically approximately 10 ms to 20 ms between samples. However, it may still possible to hear the change in the spectrum as the virtual complementary microphone is changed, particularly when the source is close to the MTB array.

Alternative E: Create a virtual complementary microphone by interpolating between the spectra of two array microphones and resynthesizing the temporal signal. As with Alternative D, this option uses different complementary signals for the right ear and the left ear, and for any given ear, the complementary signal is derived from the two microphones that are closest to that ear. Alternative E eliminates the perceptible spectral change of Alternative D by properly interpolating rather than switching between the two microphones that are closest to the ear. The problem is to smoothly combine the high-frequency part of the microphone signals without encountering phase cancellation effects. The basic solution, which exploits the ear's insensitivity to phase at high frequencies, involves three steps: (a) estimation of the short-time spectrum for the signals from each microphone, (b) interpolation between the spectra, and (c) resynthesis of the temporal waveform from the spectra. The subject of signal processing by spectral analysis, modification, and resynthesis is well known in the signal-processing community. The classical methods include (a) Fast-Fourier Transform analysis and resynthesis, and (b) filter-bank analysis and resynthesis.

Advantages (1) Avoids the need for additional channels.
(2) Correct ILD.
(3) No switching transients or spectral artifacts.

Disadvantages (1) No longer bandwidth efficient. (Same as for Alternative C).

(2) Large computational requirements.

Appropriate circumstances for preferring one or the other of these five alternative embodiments can be summarized as follows: Alternative A is preferable when bandwidth efficiency is the dominant concern; Alternative B provides a good compromise for focused applications; Alternative C is attractive for remote listening (teleconferencing) if the cost for bandwidth is acceptable; Alternative D provides performance that can be close to that of Alternative E at much less computational expense; and Alternative E is preferable when maximum realism is the dominant concern.

Table 2 summarizes the advantages and disadvantages of Procedures 1 and 2, as well as Procedure 3 for Alternative A and Alternative D.

Note that MTB attempts to capture the sound field that would exist at a listener's ears by inserting a surface such as a sphere in the sound field and sensing the pressure near the places where the listener's ears would be located. There are two major ways in which this could produce an inadequate approximation:

1. Mismatched head size. If the sphere is smaller than the listener's head, the interaural differences produced will be smaller than what the listener normally experiences. Conversely, if the sphere is larger than the listener's head, the interaural differences produced will be larger than normal. In addition to producing static localization errors, this leads to instability of the locations of the sound sources when the listener turns his or her head. If the sphere is smaller than the listener's head, the source will appear to rotate slightly with the listener, while if the sphere is larger the source will appear to rotate opposite to the listener's motion.

2. Absence of pinna cues. It is well established that the outer ear or pinna modifies the spectrum of the sound that eventually reaches the ear drum, and that this modification varies with both azimuth and elevation. These spectral changes produce pinna cues that are particularly important for judging the elevation of a source. Their exact nature is complicated and varies significantly from person to person. However, a primary characteristic is an spectral notch whose center frequency changes systematically with elevation. The spectral modifications are minimum when the source is overhead. Because the MTB surface does not include any pinnae, there is no corresponding spectral change. Because no change corresponds to high elevation, most listeners perceive the sources to be somewhat elevated, regardless of their actual elevations.

No general procedures are known for completely correcting these two problems. However, there are useful methods for special but important situations.

Mismatched head size can be easily corrected for focused applications, where the listener is usually looking more or less in one direction. Let a be the radius of the sphere, b be the radius of the listener's head, and $\theta$ be the head rotation angle. Then the apparent location of a source that is located directly ahead can be stabilized by using $(b/a)\theta$ in place of $\theta$ when processing the microphone data. This simple correction works well for small angles of head rotation. In addition, it is not necessary to measure the listener's head radius to use this technique. One need only use $\alpha\theta$ in place of $\theta$, and allow the listener to adjust the coefficient $\alpha$ until the image is stabilized.

It is also possible to correct for the absence of pinna cues if the sound sources of interest are more or less in the horizontal plane. In this case, a filter that approximates the pinna transfer function is introduced in the signal path to each ear, and the user is allowed to adjust the filter parameters until the sound images appear to be in the horizontal plane.

From the foregoing description, it will be appreciated that the general concept behind the invention is to (a) use multiple microphones to sample the sound field at points near the location of the ears for all possible head orientations, (b) use a head tracker to determine the distances from the listener's ears to each of the microphones, (c) low-pass-filter the microphone outputs, (d) linearly interpolate (equivalently: weight, combine, "pan") the low-pass-filtered outputs to estimate the low-frequency part of the signals that would be picked up by microphones at the listener's ear locations, and (e) reinsert the high-frequency content. This same general concept can be implemented and extended in a variety of alternative ways. The following are among the alternatives:

1. Use either a very small or a very large number of microphones. A small number of microphones can be used if the cutoff frequency of the low-pass filter is adjusted appropriately. Even with only two microphones, it is possible to obtain the benefits of dynamic modification as long as the sources are not too close to the median plane for the microphones. Alternatively, if a large number of microphones can be economically employed, the low-pass filtering and high-frequency restoration steps can be eliminated. With enough microphones, the interpolation procedure can be replaced by simple switching.

2. Generalize the configuration shown in FIG. 8 by affixing microphones over the entire surface of a sphere and by using the head tracker to sense the elevation as well as the azimuth of the listener. The nearest and next nearest microphones need no longer be in the horizontal plane, and arbitrary head rotations can be accommodated.

3. Introduce an artificial torso below the head. Scattering of sound by the torso provides additional localization cues that may be helpful both for elevation and for externalization. Although including a torso would make the microphone array much larger and clumsier, it may be justified for particularly demanding applications.

4. Replace each microphone by a microphone array to reject or reduce unwanted sound pickup. This is particularly attractive when the unwanted sounds are at either rather high or rather low elevations and the MTB surface is a truncated cylinder. In this case, each microphone can be replaced by a vertical column of microphones, whose outputs can be combined to reduce the sensitivity outside the horizontal plane.

Figure 11:
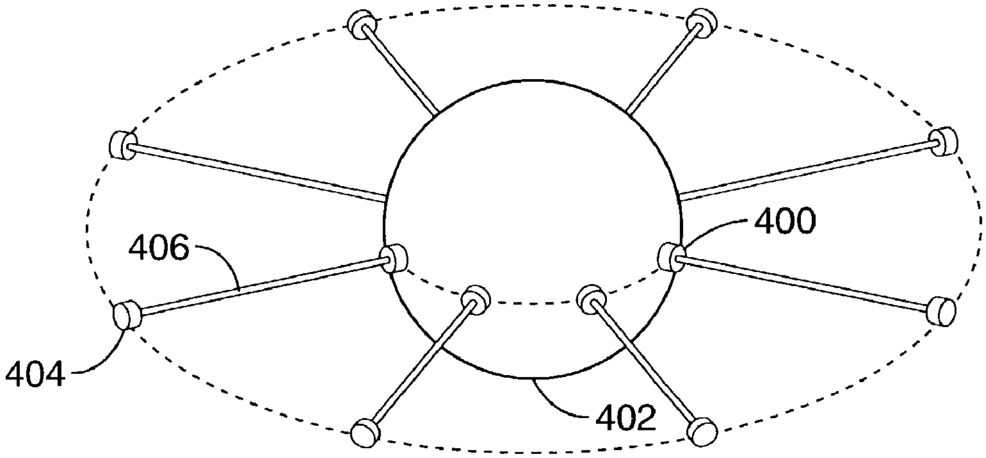
FIG. 11 is a schematic diagram of a direction finding microphone configuration according to the present invention.

5. To use MTB as an acoustic direction finder, employ two concentric MTB arrays, with, for example, the microphones 400 for the smaller array being mounted on a head-size sphere 402, and the microphones 404 for the larger array being mounted on rigid rods 406 extending from the sphere as shown in FIG. 11. The smaller MTB array is used as usual, and the listener turns to face the source. The listener then switches to the larger MTB array. If the listener is pointing directly at the source, the source's image will appear to be centered. Small head motions will result in magnified motions of the image, which makes it easier to localize the source.

It will be appreciated that there are many alternative techniques for recording spatial sound, with surround-sound systems being particularly popular. It is desirable to be able to use our invention to reproduce existing spatial sound recordings over headphones.

As was mentioned above, a direct approach would be to re-record an existing recording, placing the microphone array at the "sweet spot" of a state-of-the-art surround-sound system. This has the advantage that it would provide the listener with the optimal listening experience. On the other hand, past commercial experience has shown that it is undesirable to present the public with the same content in more than one format.

An alternative approach is to simulate the process of re-recording, using simulated loudspeakers to excite a simulated microphone array in a simulated room. In the simplest situation, a spherical-head model (V. R. Algazi, R. O. Duda and D. M. Thompson, "The use of head-and-torso models for improved spatial sound synthesis," Preprint 5712, 113th Convention of the Audio Engineering Society (Los Angeles, Calif., Oct. 5-8, 2002, incorporated herein by reference) could be used to compute the signal that a particular microphone in the microphone array would pick up from each of the virtual loudspeakers. For greater realism, a room model could be used to simulate the effects of room reflections and reverberation (D. B. Begault, 3-*D Sound for Virtual Reality and Multimedia* (AP Professional, Boston, 1994), incorporated herein by reference). This signal-processing procedure can be readily implemented in special real-time hardware that converts signals in the original recording format to signals in our MTB (Motion-Tracked Binaural) format. By routing the signals from a conventional playback unit through such a format converter, one or many listeners can listen to any CD or DVD through headphones and still enjoy the benefits of responsiveness to head motion.

The same advantages of MTB can be realized for the rendering of a completely computer generated sounds, both for the creation of virtual auditory space and for the spatialized auditory display of data. All that is required is to compute the sounds that would be captured by a simulated MTB microphone array. The computed microphone signals can then be used in place of the signals from physical microphones so that one or many listeners can listen to the virtual sounds through headphones and still enjoy the benefits of responsiveness to head motion. To cover the use of live physical microphones, recorded physical microphones, and simulated microphones, in the Claims we refer to signals picked up by physical microphones, signals recorded from physical microphones, and signals computed for simulated microphones as signals "representative" of the microphone outputs.

As can be seen, therefore, the preferred embodiment of the present invention uses more than two microphones for sound capture; uses a head-tracking device to measure the orientation of the listener's head; and uses psychoacoustically-based signal processing techniques to combine the outputs of the microphones. The present invention has the ability to record any naturally occurring sounds (including room reflections and reverberation), and to solve the major limitations of static binaural recording, using a small, fixed number of channels to provide the listener with stable locations for virtual auditory sources, independent of the listener's head motion; good frontal externalization; and little or no front/back confusion. The present invention further addresses the recording of live sounds. With live sounds it is difficult or impossible to obtain separate signals for all of the sound sources, not to mention the perceptually important echoes and reverberation; and the locations of the sources are usually not known. Furthermore, with the present invention there is a small, fixed number of channels; approximate HRTFs are automatically produced by the microphone array; and the complex actual room echoes and reverberation are automatically captured.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

| N | $f_{max}$ (Hz) |
|---|---|
| 2 | 312 |
| 3 | 468 |
| 4 | 624 |
| 5 | 780 |
| 6 | 936 |
| 7 | 1,092 |
| 8 | 1,248 |
| 9 | 1,404 |
| 10 | 1,560 |
| 11 | 1,716 |
| 12 | 1,872 |
| 13 | 2,028 |
| 14 | 2,184 |
| 15 | 2,340 |
| 16 | 2,496 |

TABLE 2

| | Procedure: | | | |
|---|---|---|---|---|
| | 1 | 2 | 3A | 3D |
| Advantages | | | | |
| Vividly realistic sound reproduction | x | x | x | x |
| Widely applicable* (recording and telephony) | x | x | x | x |
| Captures both of the major binaural cues (ITD, ILD) | x | x | | x |
| Faithfully reproduces sounds at all distances | x | x | x | x |
| Eliminates front/back confusion | x | x | x | x |
| Responds accurately to listener head motion | | x | x | x |
| Produces stabilized sound images | | x | x | x |
| Supports any number of simultaneous listeners | x | x | x | x |
| Provides a universal format for other capture techniques | x | x | x | x |
| Makes efficient use of bandwidth | x | x | x | |
| No special skills needed for making recordings | x | x | x | x |
| Compact and potentially inexpensive reproduction system | x | x | x | x |
| Disadvantages | | | | |
| Requires a head tracker | x | x | x | x |
| Requires headphones for best results | x | x | x | x |
| May not correctly reproduce the elevation of the source | x | x | x | x |
| Requires many microphones for full bandwidth | x | x | | |
| May introduce clicks when head is moved | x | | | |
| May introduce significant spectral coloration | | x | | |
| May produce "split images" with wideband sources | | | x | |

*Games, radio, television, motion pictures, home theater, music recording, teleconferencing, surveillance, virtual reality, audio system evaluation, psychoacoustic research etc.

What is claimed is:

1. A sound reproduction apparatus, comprising:

(a) a signal processing unit;

(b) said signal processing unit having an input for connection to a head tracking device;

(c) said signal processing unit configured to receive input signals representative of output signals of a plurality of microphones positioned to sample a sound field at points representing possible locations of a listener's ear if said listener's head were positioned in said sound field at the location of said microphones;

(d) said signal processing unit having an output for presenting a signal to an audio output device in response to orientation of said listener's head as indicated by said head tracking device;

(e) said signal processing unit configured to separate low-frequency components of said input signals from high-frequency components of said input signals based on a cutoff frequency that is a function of the distance between the microphones;

(f) said signal processing unit configured to interpolate the low-frequency components of said input signals and produce a low-frequency signal representing the low-frequency components associated with the location of the listener's ear;

(g) said signal processing unit configured to produce a complementary high-frequency signal for the listener's ear by processing said high-frequency components as a function of the location of the listener's ear;

(h) said signal processing unit configured to form a composite signal by adding said low-frequency signal to said high-frequency signal;

(l) wherein said composite signal is presented to said audio output device.

2. An apparatus as recited in claim 1, wherein said signal processing unit is configured to interpolate low-frequency components of signals representative of the output from a nearest microphone and a next nearest microphone in relation to the position of an ear of the listener in said sound field if said listener's head were positioned in said sound field at the location of said microphones.

3. An apparatus as recited in claim 1, wherein said signal processing unit comprises:

a low-pass filter associated with each of said microphone output signals; and means for interpolating outputs of said low-pass filters to produce an output signal for an ear of the listener, wherein said output signal comprises an interpolation of signals representative of the output from a nearest microphone and a next nearest microphone in relation to the position of the listener's ear in said sound field if said listener's head were positioned in said sound field at the location of said microphones.

4. An apparatus as recited in claim 3, wherein signal processing unit further comprises:

a high-pass filter configured to provide an output signal from a complementary microphone located in said sound field; and means for adding said output signal from said high-pass filter to said interpolated output signal for the listener's ear.

5. A sound reproduction apparatus, comprising:

(a) a signal processing unit;

(b) said signal processing unit having an input for connection to a head tracking device;

(c) said signal processing unit configured to receive input signals representative of output signals of a plurality of microphones positioned to sample a sound field at points representing possible locations of a listener's left and right ears if said listener's head were positioned in said sound field at the location of said microphones;

(d) said signal processing unit having an output for presenting a binaural signal to an audio output device in response to orientation of said listener's head as indicated by said head tracking device;

(e) said signal processing unit configured to separate low-frequency components of said input signals from high-frequency components of said input signals based on a cutoff frequency that is a function of the distance between microphones;

(f) said signal processing unit configured to interpolate the low-frequency components of said input signals and produce a left ear low-frequency signal representing the low-frequency components associated with the location of the listener's left ear;

(g) said signal processing unit configured to interpolate the low-frequency components of said input signals and produce a right ear low-frequency signal representing the low-frequency components associated with the location of the listener's right ear;

(h) said signal processing unit configured to produce a complementary high-frequency signal for the left ear by processing said high-frequency components as a function of the location of the listener's left ear;

(i) said signal processing unit configured to produce a complementary high-frequency signal for the right ear by processing said high-frequency components as a function of the location of the listener's right ear;

(j) said signal processing unit configured to form a left ear composite signal by adding said left ear low-frequency signal to said left ear high-frequency signal;

(k) said signal processing unit configured to form a right ear composite signal by adding said right ear low-frequency signal to said right ear high-frequency signal;

(l) wherein said binaural signal comprises said right ear composite signal and said left ear composite signal.

6. An apparatus as recited in claim 5:

wherein said signal processing unit is configured to interpolate low-frequency components of signals representative of the output from a nearest microphone and a next nearest microphone in relation to the position of the listener's left ear in said sound field if said listener's head were positioned in said sound field at the location of said microphones; and wherein said signal processing unit is configured to interpolate low-frequency components of signals representative of the output from a nearest microphone and a next nearest microphone in relation to the position of the listener's right ear in said sound field if said listener's head were positioned in said sound field at the location of said microphones.

7. An apparatus as recited in claim 5, wherein said signal processing unit comprises:

a low-pass filter associated with each of said microphone output signals;

means for interpolating outputs of said low-pass filters to produce an interpolated output signal for the listener's left ear, wherein said interpolated output signal comprises an interpolation of signals representative of the output from a nearest microphone and a next nearest microphone in relation to the position of the listener's left ear in said sound field if said listener's head were positioned in said sound field at the location of said microphones; and means for interpolating outputs of said low-pass filters to produce an interpolated output signal for the listener's right ear, wherein said interpolated output signal comprises an interpolation of signals representative of the output from a nearest microphone and a next nearest microphone in relation to the position of the listener's right ear in said sound field if said listener's head were positioned in said sound field at the location of said microphones.

8. An apparatus as recited in claim 7, wherein signal processing unit further comprises:

a left-ear high-pass filter configured to provide an output from a left-ear complementary microphone located in said sound field;

a right-ear high-pass filter configured to provide an output from a right-ear complementary microphone located in said sound field;

means for adding said output from said left-ear high-pass filter to said interpolated output for the listener's left ear; and means for adding said output from said right-ear high-pass filter to said interpolated output for the listener's right ear.

9. A sound reproduction apparatus, comprising:

(a) a signal processing unit;

(b) said signal processing unit having an input for connection to a head tracking device;

(c) said signal processing unit configured to receive input signals representative of output signals of a plurality of microphones positioned to sample a sound field at points representing possible locations of a listener's ear if said listener's head were positioned in said sound field at the location of said microphones;

(d) said signal processing unit having an output for presenting a signal to an audio output device in response to orientation of said listener's head as indicated by said head tracking device;

(e) said signal processing unit comprising means for separating low-frequency components of said input signals from high-frequency components of said input signals based on a cutoff frequency that is a function of the distance between microphones, interpolating the low-frequency components of said input signals and producing a low-frequency signal representing the low-frequency components associated with the location of the listener's ear, producing a complementary high-frequency signal for the listener's ear by processing said high-frequency components as a function of the location of the listener's ear, and forming a composite signal by adding said low-frequency signal to said high-frequency signal, wherein said composite signal is presented to said audio output device.

10. An apparatus as recited in claim 9, wherein said signal processing unit further comprises means for interpolating low-frequency components of signals representative of the output from a nearest microphone and a next nearest microphone in relation to the position of an ear of the listener in said sound field if said listener's head were positioned in said sound field at the location of said microphones.

11. An apparatus as recited in claim 9, wherein said signal processing unit further comprises:

a low-pass filter associated with each of said microphone output signals; and means for interpolating outputs of said low-pass filters to produce an interpolated output signal for an ear of the listener, wherein said interpolated output signal comprises an interpolation of signals representative of the output from a nearest microphone and a next nearest microphone in relation to the position of the listener's ear in said sound field if said listener's head were positioned in said sound field at the location of said microphones.

12. An apparatus as recited in claim 11, wherein signal processing unit further comprises:

a high-pass filter configured to provide an output signal from a complementary microphone located in said sound field; and means for adding said output signal from said high-pass filter to said interpolated output signal for the listener's ear.

13. An apparatus for dynamic binaural sound capture and reproduction, comprising:

(a) a plurality of microphones positioned to sample a sound field at points representing possible locations of an ear of a listener if said listener's head were positioned in said sound field at the location of said microphones, wherein said microphones produce corresponding microphone output signals;

(b) a signal processing unit;

(c) said signal processing unit having an input for connection to a head tracking device;

(d) said signal processing unit configured to receive input signals representative of said microphone output signals;

(e) said signal processing unit having an output for presenting a signal to an audio output device in response to orientation of said listener's head as indicated by said head tracking device;

(f) said signal processing unit configured to separate low-frequency components of said input signals from high-frequency components of said input signals based on a cutoff frequency that is a function of the distance between microphones;

(g) said signal processing unit configured to interpolate the low-frequency components of said input signals and produce a low-frequency signal representing the low-frequency components associated with the location of the listener's ear;

(h) said signal processing unit configured to produce a complementary high-frequency signal for the listener's ear by processing said high-frequency components as a function of the location of the listener's ear;

(i) said signal processing unit configured to form a composite signal by adding said low-frequency signal to said high-frequency signal;

(j) wherein said composite signal is presented to said audio output device.

14. An apparatus as recited in claim 13, wherein said signal processing unit is configured to interpolate low-frequency components of signals representative of the output from a nearest microphone and a next nearest microphone in relation to the position of an ear of the listener in said sound field if said listener's head were positioned in said sound field at the location of said microphones.

15. An apparatus as recited in claim 13, wherein said signal processing unit comprises:

a low-pass filter associated with each of said microphone output signals; and means for interpolating outputs of said low-pass filters to produce an interpolated output signal for an ear of the listener, wherein said interpolated output signal comprises an interpolation of signals representative of the output from a nearest microphone and a next nearest microphone in relation to the position of the listener's ear in said sound field if said listener's head were positioned in said sound field at the location of said microphones.

16. An apparatus as recited in claim 15, further comprising:

a complementary microphone positioned in said sound field;

a high-pass filter configured to provide an output signal from said complementary microphone; and means for adding said output signal from said high-pass filter to said interpolated output signal for the listener's ear;

wherein high-frequency content removed by said low-pass filters is reinserted.

17. An apparatus as recited in claim 16, wherein said complementary microphone comprises a real or virtual microphone selected from the group consisting essentially of a microphone that is separate from said microphones in said plurality of microphones, one of said microphones in said plurality microphones, a virtual microphone created from signals from a plurality of dynamically-switched microphones in said plurality of microphones, and a virtual microphone created by spectral interpolation of signals from two microphones in said plurality of microphones.

18. An apparatus for dynamic binaural sound capture and reproduction, comprising:

(a) a plurality of microphones positioned to sample a sound field at points representing possible locations of a listener's left and right ears if said listener's head were positioned in said sound field at the location of said microphones, wherein said microphones produce corresponding microphone output signals; and (b) a signal processing unit;

(c) said signal processing unit having an input for connection to a head tracking device;

(d) said signal processing unit configured to receive input signals representative of said microphone output signals;

(e) said signal processing unit having an output for presenting a binaural signal to an audio output device in response to orientation of said listener's head as indicated by said head tracking device;

(f) said signal processing unit configured to separate low-frequency components of said input signals from high-frequency components of said input signals based on a crossover frequency that is a function of the distance between microphones;

(g) said signal processing unit configured to interpolate the low-frequency components of said input signals and produce a left ear low-frequency signal representing the low-frequency components associated with the location of the listener's left ear;

(h) said signal processing unit configured to interpolate the low-frequency components of said input signals and produce a right ear low-frequency signal representing the low-frequency components associated with the location of the listener's right ear;

(i) said signal processing unit configured to produce a complementary high-frequency signal for the left ear by processing said high-frequency components as a function of the location of the listener's left ear;

(j) said signal processing unit configured to produce a complementary high-frequency signal for the right ear by processing said high-frequency components as a function of the location of the listener's right ear;

(k) said signal processing unit configured to form a left ear composite signal by adding said left ear low-frequency signal to said left ear high-frequency signal;

(l) said signal processing unit configured to form a right ear composite signal by adding said right ear low-frequency signal to said right ear high-frequency signal;

(m) wherein said binaural signal comprises said right ear composite signal and said left ear composite signal.

19. An apparatus as recited in claim 18:

wherein said signal processing unit is configured to interpolate low-frequency components of signals representative of the output from a nearest microphone and a next nearest microphone in relation to the position of the listener's left ear in said sound field if said listener's head were positioned in said sound field at the location of said microphones; and wherein said signal processing unit is configured to interpolate low-frequency components of signals representative of the output from a nearest microphone and a next nearest microphone in relation to the position of the listener's right ear in said sound field if said listener's head were positioned in said sound field at the location of said microphones.

20. An apparatus as recited in claim 18, wherein said signal processing unit comprises:

a low-pass filter associated with each of said microphone output signals;

means for interpolating outputs of said low-pass filters to produce a an interpolated output signal for the listener's left ear, wherein said interpolated output signal comprises an interpolation of signals representative of the output from a nearest microphone and a next nearest microphone in relation to the position of the listener's left ear in said sound field if said listener's head were positioned in said sound field at the location of said microphones; and means for interpolating outputs of said low-pass filters to produce an interpolated output signal for the listener's right ear, wherein said interpolated output signal comprises an interpolation of signals representative of the output from a nearest microphone and a next nearest microphone in relation to the position of the listener's right ear in said sound field if said listener's head were positioned in said sound field at the location of said microphones.

21. An apparatus as recited in claim 20, wherein signal processing unit further comprises:

a left-ear high-pass filter configured to provide an output from a left-ear complementary microphone located in said sound field;

a right-ear high-pass filter configured to provide an output from a right-ear complementary microphone located in said sound field;

means for adding said output from said left-ear high-pass filter to said interpolated output for the listener's left ear; and means for adding said output from said right-ear high-pass filter to said interpolated output for the listener's right ear;

wherein high-frequency content removed by said low-pass filters is reinserted.

22. An apparatus as recited in claim 21, wherein said complementary microphone comprises a real or virtual microphone selected from the group consisting essentially of a microphone that is separate from said microphones in said plurality of microphones, one of said microphones in said plurality microphones, a virtual microphone created from signals from a plurality of dynamically-switched microphones in said plurality of microphones, and a virtual microphone created by spectral interpolation of signals from two microphones in said plurality of microphones.

23. An apparatus for dynamic binaural sound capture and reproduction, comprising:

(a) a plurality of microphones positioned to sample a sound field at points representing possible locations of an ear of a listener if said listener's head were positioned in said sound field at the location of said microphones, wherein said microphones produce corresponding microphone output signals; and (b) a signal processing unit;

(c) said signal processing unit having an input for connection to a head tracking device;

(d) said signal processing unit configured to receive input signals representative of said microphone output signals;

(e) said signal processing unit having an output for presenting a signal to an audio output device in response to orientation of said listener's head as indicated by said head tracking device;

(f) said signal processing unit comprising means for separating low-frequency components of said input signals from high-frequency components of said input signals based on a crossover frequency that is a function of the distance between microphones, interpolating the low-frequency components of said input signals and producing a low-frequency signal representing the low-frequency components associated with the location of the listener's ear, producing a complementary high-frequency signal for the listener's ear by processing said high-frequency components as a function of the location of the listener's ear, and forming a composite signal by adding said low-frequency signal to said high-frequency signal, wherein said composite signal is presented to said audio output device.

24. An apparatus as recited in claim 23, wherein said signal processing unit further comprises means for interpolating low-frequency components of signals representative of the output from a nearest microphone and a next nearest microphone in relation to the position of an ear of the listener in said sound field if said listener's head were positioned in said sound field at the location of said microphones.

25. An apparatus as recited in claim 23, wherein said signal processing unit further comprises:

a low-pass filter associated with each of said microphone output signals; and means for interpolating outputs of said low-pass filters to produce an interpolated output signal for an ear of the listener, wherein said interpolated output signal comprises an interpolation of signals representative of the output from a nearest microphone and a next nearest microphone in relation to the position of the listener's ear in said sound field if said listener's head were positioned in said sound field at the location of said microphones.

26. An apparatus as recited in claim 25, further comprising:

a complementary microphone positioned in said sound field;

a high-pass filter configured to provide an output signal from said complementary microphone; and means for adding said output signal from said high-pass filter to said interpolated output signal for the listener's ear;

wherein high-frequency content removed by said low-pass filters is reinserted.

27. An apparatus as recited in claim 26, wherein said complementary microphone comprises a real or virtual microphone selected from the group consisting essentially of a microphone that is separate from said microphones in said plurality of microphones, one of said microphones in said plurality microphones, a virtual microphone created from signals from a plurality of dynamically-switched microphones in said plurality of microphones, and a virtual microphone created by spectral interpolation of signals from two microphones in said plurality of microphones.

* * * * *